US008898281B2

(12) United States Patent
Fukui et al.

(10) Patent No.: US 8,898,281 B2
(45) Date of Patent: Nov. 25, 2014

(54) INFORMATION DISTRIBUTION SYSTEM, INFORMATION DISTRIBUTION METHOD, AND INFORMATION DISTRIBUTION PROGRAM

(75) Inventors: Masayuki Fukui, Kawasaki (JP); Tatsuro Matsumoto, Kawasaki (JP); Ai Yano, Kawasaki (JP); Kazuo Sasaki, Kawasaki (JP); Eiichi Takahashi, Kawasaki (JP); Masahiro Hara, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 505 days.

(21) Appl. No.: 12/568,744

(22) Filed: Sep. 29, 2009

(65) Prior Publication Data

US 2010/0088407 A1    Apr. 8, 2010

Related U.S. Application Data

(63) Continuation of application No. PCT/JP2007/056901, filed on Mar. 29, 2007.

(51) Int. Cl.
| | |
|---|---|
| G06F 15/173 | (2006.01) |
| G06Q 10/08 | (2012.01) |
| G06Q 10/10 | (2012.01) |
| G01C 21/36 | (2006.01) |

(52) U.S. Cl.
CPC ............. *G06Q 10/107* (2013.01); *G06Q 10/08* (2013.01)
USPC ....................................................... 709/224

(58) Field of Classification Search
USPC .......................................... 709/224; 701/201
See application file for complete search history.

(56) References Cited

U.S. PATENT DOCUMENTS

| 6,119,095 A * | 9/2000 | Morita .............................. 705/5 |
| 6,446,004 B1 * | 9/2002 | Cao et al. ...................... 701/482 |
| 6,480,804 B2 | 11/2002 | Maeda et al. |

(Continued)

FOREIGN PATENT DOCUMENTS

| JP | 2000-74677 | 3/2000 |
| JP | 2000-155757 | 6/2000 |

(Continued)

OTHER PUBLICATIONS

International Search Report for PCT/JP2007/056901, mailed May 29, 2007.

*Primary Examiner* — Azizul Choudhury
*Assistant Examiner* — Tariq Najee-Ullah
(74) *Attorney, Agent, or Firm* — Staas & Halsey LLP

(57) ABSTRACT

An information distribution system includes a visit determination unit (42), a distribution range evaluation unit (43), and a distribution range change unit (44). The visit determination unit (42) determines whether a user of a mobile terminal (2) to which evaluation information has been distributed has visited a facility in the evaluation information, and upon determining affirmatively, calculates a visit distance indicating the distance between the location of the mobile terminal indicated by distribution time terminal location information and the location of the facility in the evaluation information. The distribution range evaluation unit (43) determines whether the distribution range is effective based on the visit distance. The distribution range change unit (44) updates distribution range information so that the distribution range is enlarged if the distribution range is effective, and updates the distribution range information so that the distribution range is reduced if the distribution range is not effective.

6 Claims, 20 Drawing Sheets

(56) References Cited

U.S. PATENT DOCUMENTS

| | | | |
|---|---|---|---|
| 6,553,310 B1* | 4/2003 | Lopke | 701/454 |
| 6,925,603 B1* | 8/2005 | Naito et al. | 715/733 |
| 7,469,277 B2* | 12/2008 | Hirata et al. | 709/219 |
| 2001/0054043 A1* | 12/2001 | Harlan | 707/104.1 |
| 2002/0143490 A1 | 10/2002 | Maeda et al. | |
| 2002/0156573 A1* | 10/2002 | Stefan et al. | 701/211 |
| 2004/0155815 A1* | 8/2004 | Muncaster et al. | 342/357.09 |
| 2005/0010363 A1* | 1/2005 | Hirata et al. | 701/213 |
| 2005/0079877 A1* | 4/2005 | Ichimura | 455/456.1 |
| 2006/0069503 A1* | 3/2006 | Suomela et al. | 701/211 |
| 2006/0123053 A1* | 6/2006 | Scannell, Jr. | 707/104.1 |
| 2006/0149459 A1* | 7/2006 | Matsuura et al. | 701/201 |
| 2006/0184501 A1* | 8/2006 | Yoshida et al. | 707/1 |
| 2007/0099602 A1* | 5/2007 | Kurlander et al. | 455/418 |
| 2007/0288157 A1* | 12/2007 | Peterman | 701/207 |
| 2008/0154724 A1* | 6/2008 | Machlin et al. | 705/14 |
| 2009/0143079 A1* | 6/2009 | Klassen et al. | 455/456.3 |
| 2009/0177386 A1* | 7/2009 | Haase | 701/209 |
| 2010/0076968 A1* | 3/2010 | Boyns et al. | 707/732 |
| 2010/0218116 A1* | 8/2010 | Melcher et al. | 715/747 |
| 2010/0318491 A1* | 12/2010 | Anderson et al. | 706/52 |
| 2011/0137730 A1* | 6/2011 | McCarney et al. | 705/14.58 |
| 2011/0239305 A1* | 9/2011 | Watanabe | 726/26 |

FOREIGN PATENT DOCUMENTS

| | | |
|---|---|---|
| JP | 2001-350941 | 12/2001 |
| JP | 2003-30376 | 1/2003 |
| JP | 2003-122902 | 4/2003 |
| JP | 2003-196351 | 7/2003 |
| JP | 2005-18642 | 1/2005 |
| JP | 2005-25461 | 1/2005 |
| JP | 2005-51765 | 2/2005 |
| JP | 2005-345325 | 12/2005 |
| JP | 2006-60454 | 3/2006 |

* cited by examiner

| Mobile terminal ID | Latitude information | Longitude information | Last updated time |
|---|---|---|---|
| A001 | nnn. nn | nnn. nn | 2007/01/01 15:00:00 |
| A002 | nnn. nn | nnn. nn | 2007/01/01 14:59:59 |
| A003 | nnn. nn | nnn. nn | 2007/01/01 14:40:00 |
| A004 | nnn. nn | nnn. nn | 2007/01/01 13:10:00 |
| A005 | nnn. nn | nnn. nn | 2007/01/01 15:15:00 |
| A006 | nnn. nn | nnn. nn | 2007/01/01 15:20:00 |
| ... | ... | ... | ... |

FIG. 2

| Facility ID | Facility type ID | Facility name | Latitude information | Longitude information | Facility location range | Facility address |
|---|---|---|---|---|---|---|
| C0001 | C1001 | AAA | nnn.nn | nnn.nn | 20 | XX-town 1-chome, YY-city, ZZ-prefecture |
| G0001 | G1001 | CCC | nnn.nn | nnn.nn | 40 | XX-town 2-chome, YY-city, ZZ-prefecture |
| P0001 | P1001 | EEE | nnn.nn | nnn.nn | 30 | XX-town 3-chome, YY-city, ZZ-prefecture |
| C0002 | C1001 | GGG | nnn.nn | nnn.nn | 25 | XX-town 4-chome, YY-city, ZZ-prefecture |
| P0002 | P1001 | HHH | nnn.nn | nnn.nn | 50 | XX-town 5-chome, YY-city, ZZ-prefecture |
| ... | ... | ... | ... | ... | ... | ... |

| Evaluation ID | Facility ID | Evaluation comment | Distribution range |
|---|---|---|---|
| E0001 | C0001 | Wide variety of rice balls | 3 |
| E0002 | G0001 | Gas is always cheap | 10 |
| E0003 | C0002 | Alcohol is available too | 5 |
| E0004 | P0001 | Parking lot is big | 2 |
| ... | ... | ... | ... |

FIG. 4

| Mobile terminal ID | Username | Email address |
|---|---|---|
| A001 | Taro Yamada | a001@example. ne. jp |
| A002 | Jiro Yamada | a002@example. ne. jp |
| A003 | Saburo Yamada | a003@example. ne. jp |
| ... | ... | ... |

From: info@example. co.jp

To: a001@example. co.jp

Subject: information about convenience store "AAA"

Convenience store "AAA" has a wide variety of rice balls.

Give it a try.

From: info@example.co.jp

To: a001@example.co.jp

Subject: information about gas station "CCC"

The gas is always cheap at gas station "CCC".
Give it a try.

FIG. 7

| Facility type ID | Facility type name | Stay determination time |
|---|---|---|
| C1001 | Convenience store | 300 |
| G1001 | Gas station | 300 |
| P1001 | Parking lot | 900 |
| ... | ... | ... |

FIG. 8

| Evaluation ID | Mobile terminal ID | Distribution time latitude information | Distribution time longitude information | Distribution time | Visit state | Visit distance |
|---|---|---|---|---|---|---|
| E0001 | A001 | nnn.nn | nnn.nn | 2007/03/01 12:00:00 | true | 3 |
| E0001 | A002 | nnn.nn | nnn.nn | 2007/03/01 12:10:00 | true | 3 |
| E0001 | A003 | nnn.nn | nnn.nn | 2007/03/01 12:15:00 | false | 0 |
| E0002 | A001 | nnn.nn | nnn.nn | 2007/03/01 9:00:00 | true | 8 |
| E0002 | A002 | nnn.nn | nnn.nn | 2007/03/01 9:10:00 | false | 0 |
| ... | ... | ... | ... | ... | ... | ... |

| Evaluation ID | Facility ID | Evaluation comment | Distribution range |
|---|---|---|---|
| E0001 | C0001 | Wide variety of rice balls | 4 |
| E0002 | G0001 | Gas is always cheap | 9 |
| E0003 | C0002 | Alcohol is available too | 5 |
| E0004 | P0001 | Parking lot is big | 2 |
| ... | ... | ... | ... |

FIG. 10

INFORMATION DISTRIBUTION SYSTEM, INFORMATION DISTRIBUTION METHOD, AND INFORMATION DISTRIBUTION PROGRAM

CROSS-REFERENCE TO RELAXED APPLICATION

This application is a continuation application which is based upon and claims the benefit of priority of the prior PCT Application No. PCT/JP2007/056901, filed on Mar. 29, 2007, the entire contents of which are incorporated herein by reference.

FIELD

The embodiments discussed herein are relates to an information distribution system, an information distribution method, and an information distribution program that, if the current location of a mobile terminal is within a distribution range from a facility, distribute evaluation information indicating an evaluation of the facility to the mobile terminal.

BACKGROUND

In recent years, users who used a facility have posted evaluation information that indicates an evaluation of the facility to bulletin boards on websites, personal web pages, blogs, and the like. Users therefore can browse evaluation information at bulletin boards on websites, web pages, blogs, and the like. Users can determine whether to use a facility based on the evaluation information they have browsed.

Also, in recent years, there is known technology in which, instead of a user actively browsing bulletin boards on websites, web pages, blogs and the like, an information distribution apparatus collects evaluation information from users, and distributes the collected evaluation information to the portable terminals of an unspecified number of users, or to the portable terminals of users who desire the evaluation information (e.g., see Japanese Laid-open Patent Publication No. 2001-350941A and Japanese Laid-open Patent Publication No. 2003-30376A). Such an information distribution apparatus determines whether to distribute the evaluation information in accordance with, for example, the current location of a user's portable terminal. Specifically, if the current location of the portable terminal is within a certain range (distribution range) from a facility whose evaluation information is to be distributed, the information distribution apparatus distributes such evaluation information to the user's portable terminal.

Here, if the distribution range is a wide range, there is the problem that evaluation information is distributed to the portable terminals of users who have no intention at all of visiting the facility in the evaluation information, such as users who are far away from the facility. In order to address such a problem, an information distribution apparatus having a limited distribution range has been proposed (e.g., see Japanese Laid-open Patent Publication No. 2005-345325A). However, if the distribution range is limited, there are cases in which, contrary to the above problem, evaluation information is not distributed to the portable terminals of users who desire the distribution of the evaluation information. In view of this, there has been a proposal for an information distribution apparatus that dynamically changes the distribution range in accordance with whether users have browsed the evaluation information (e.g., see Japanese Laid-open Patent Publication No. 2006-60454A). Specifically, this information distribution apparatus enlarges the distribution range if the number of users who have browsed the evaluation information is large, and reduces the distribution range if this number is small.

SUMMARY

According to an aspect of the invention, an information distribution system of the present invention for achieving the above aim includes: a location information acquisition unit that acquires terminal location information indicating the current location of a mobile terminal; a location information storage unit that stores the terminal location information; a location information update unit that updates terminal location information stored in the location information storage unit to terminal location information that has been acquired by the location information acquisition unit; an evaluation information storage unit that stores evaluation information indicating an evaluation of a facility, and distribution range information indicating a distribution range from the facility for distributing the evaluation information to the mobile terminal; an evaluation information distribution unit that distributes the evaluation information to the mobile terminal if the current location of the mobile terminal indicated by the terminal location information is within the distribution range indicated by the distribution range information; a distribution information storage unit that stores distribution time terminal location information indicating the location of the mobile terminal at a time when the evaluation information distribution unit distributed the evaluation information to the mobile terminal; a visit determination unit that, based on the terminal location information or on setting information indicating a facility that a user of the mobile terminal has set as a navigation destination or stopover, determines whether the user of the mobile terminal to which the evaluation information has been distributed has visited the facility in the evaluation information, and upon determining that the user of the mobile terminal has visited the facility in the evaluation information, calculates a visit distance indicating the distance between the location of the mobile terminal indicated by the distribution time terminal location information and the location of the facility in the evaluation information; a distribution range evaluation unit that determines whether the distribution range is effective based on the visit distance; and a distribution range change unit that updates the distribution range information so that the distribution range is enlarged if the distribution range evaluation unit has determined that the distribution range is effective, and updates the distribution range information so that the distribution range is reduced if the distribution range evaluation unit has determined that the distribution range is not effective.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram showing an exemplary data structure of a location information management table in an information distribution apparatus of the communication system.

FIG. 3 is a diagram showing an exemplary data structure of a facility information management table in the information distribution apparatus.

FIG. 4 is a diagram showing an exemplary data structure of an evaluation information management table in the information distribution apparatus.

FIG. 5 is a diagram showing an exemplary data structure of a user information management table in the information distribution apparatus.

FIG. 6 is a conceptual diagram showing an example of evaluation information displayed by an alert unit in a mobile terminal of the communication system.

FIG. 7 is a conceptual diagram showing another example of evaluation information displayed by the alert unit.

FIG. 8 is a diagram showing an exemplary data structure of a stay determination time management table in the information distribution apparatus.

FIG. 9 is a diagram showing an exemplary data structure of a distribution information management table in the information distribution apparatus.

FIG. 10 is a diagram showing an exemplary data structure of the evaluation information management table that has been updated by a distribution range change unit in the information distribution apparatus.

DESCRIPTION OF EMBODIMENTS

Figure 1:
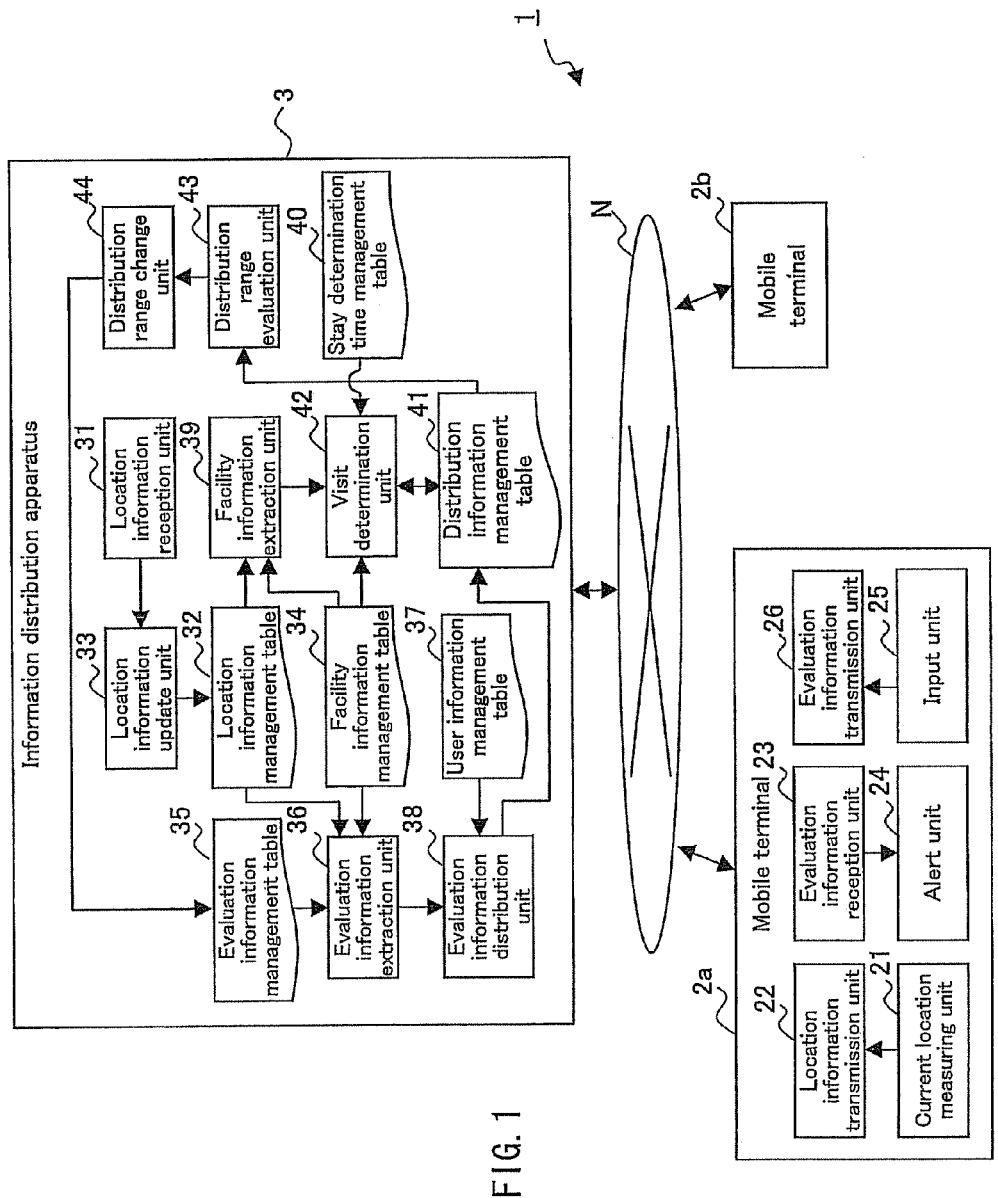
FIG. 1 is a block diagram showing a schematic configuration of a communication system according to Embodiment 1 of the present invention.

In the conventional methods described above, the distribution range is enlarged when the number of users who have browsed the evaluation information is large, even if the number of users who have actually visited the facility in the evaluation information is small. For this reason, there is the problem that evaluation information is distributed to portable terminals (mobile terminals) in a wide range even if the evaluation information is not beneficial.

According to an aspect of the invention, an information distribution system of the present invention for achieving the above aim includes: a location information acquisition unit that acquires terminal location information indicating the current location of a mobile terminal; a location information storage unit that stores the terminal location information; a location information update unit that updates terminal location information stored in the location information storage unit to terminal location information that has been acquired by the location information acquisition unit; an evaluation information storage unit that stores evaluation information indicating an evaluation of a facility, and distribution range information indicating a distribution range from the facility for distributing the evaluation information to the mobile terminal; an evaluation information distribution unit that distributes the evaluation information to the mobile terminal if the current location of the mobile terminal indicated by the terminal location information is within the distribution range indicated by the distribution range information; a distribution information storage unit that stores distribution time terminal location information indicating the location of the mobile terminal at a time when the evaluation information distribution unit distributed the evaluation information to the mobile terminal; a visit determination unit that, based on the terminal location information or on setting information indicating a facility that a user of the mobile terminal has set as a navigation destination or stopover, determines whether the user of the mobile terminal to which the evaluation information has been distributed has visited the facility in the evaluation information, and upon determining that the user of the mobile terminal has visited the facility in the evaluation information, calculates a visit distance indicating the distance between the location of the mobile terminal indicated by the distribution time terminal location information and the location of the facility in the evaluation information; a distribution range evaluation unit that determines whether the distribution range is effective based on the visit distance; and a distribution range change unit that updates the distribution range information so that the distribution range is enlarged if the distribution range evaluation unit has determined that the distribution range is effective, and updates the distribution range information so that the distribution range is reduced if the distribution range evaluation unit has determined that the distribution range is not effective.

According to the information distribution system of the present invention, the visit determination unit determines whether the user of the mobile terminal to which evaluation information has been distributed has visited the facility in the evaluation information based on the terminal location information indicating the current location of the mobile terminal, or setting information indicating a facility that has been set as the navigation destination or stopover by the user of the mobile terminal. Note that the mobile terminal is a portable terminal such as a mobile phone, a PHS, or a PDA, or a navigation apparatus that can be mounted to a moving body such as vehicle. Upon determining that the user of the mobile terminal to which the evaluation information has been distributed has visited the facility in the evaluation information, the visit determination unit calculates a visit distance indicating the distance between the location of the mobile terminal indicated by the distribution time terminal location information and the location of the facility in the evaluation information. The distribution range evaluation unit determines whether the distribution range is effective based on the visit distance. If it has been determined that the distribution range is effective, the distribution range change unit updates the distribution range information so that the distribution range is enlarged. However, if it has been determined that the distribution range is not effective, the distribution range change unit updates the distribution range information so that the distribution range is reduced. Accordingly, whether the distribution range is effective can be determined based on the visit status (visit distance) of a user of a mobile terminal who has visited the facility in the evaluation information. It is therefore possible to enlarge the distribution range if the distribution range is effective, and reduce the distribution range if the distribution range is not effective.

According to an aspect of the invention, in the above information distribution system of the present invention, it is preferable that when a plurality of users of mobile terminals have visited the facility in the evaluation information, the distribution range evaluation unit determines that the distribution range is effective if a sum of visit distances of the plurality of users of mobile terminals who have visited the facility in the evaluation information is greater than or equal to a threshold value, and determines that the distribution range is not effective if the sum of the visit distances of the plurality of users of mobile terminals who have visited the facility in the evaluation information is less than the threshold value.

According to this configuration, the distribution range evaluation unit determines that the distribution range is effective if the sum of the visit distances of the users of mobile terminals who have visited the facility in the evaluation information is greater than or equal to the threshold value. Specifically, if the sum of the visit distances is greater than or equal to the threshold value, the users of mobile terminals to which the evaluation information has been distributed have visited the facility in the evaluation information from a long distance. Therefore, in such a case, there is a high possibility that the evaluation information is beneficial evaluation information. Thus, the distribution range evaluation unit can determine that the distribution range is effective. However, if the sum of the visit distances is less than the threshold value, the distribution range evaluation unit determines that the distribution range is not effective. In other words, if the sum of the visit distances is less than the threshold value, the users of mobile terminals to which the evaluation information has been distributed have visited the facility in the evaluation information from a short distance, or the users of mobile terminals to which the evaluation information has been distributed have not visited the facility in the evaluation information. Therefore, in such a case, there is a high possibility that the evaluation information is not beneficial evaluation information. Thus, the distribution range evaluation unit can determine that the distribution range is not effective.

According to an aspect of the invention, in the above information distribution system of the present invention, it is preferable that the information distribution system further includes: a facility information storage unit that stores facility information identifying a facility and facility location information indicating a location range of the facility; and a stay determination time storage unit that stores a stay determination time that is a threshold value for determining whether the user of the mobile terminal is staying at a facility, wherein the visit determination unit determines that the user of the mobile terminal to which the evaluation information has been distributed has visited the facility in the evaluation information if the current location indicated by the terminal location information of the mobile terminal has been in the location range indicated by the facility location information of the facility in the evaluation information for at least the stay determination time.

According to this configuration, the visit determination unit determines that the user of the mobile terminal has visited a facility if the current location indicated by the terminal location information of the mobile terminal to which the evaluation information has been distributed has been within the location range indicated by the facility location information of the facility in the evaluation information for at least the stay determination time. Accordingly, the visit determination unit can determine that the user of the mobile terminal has not visited the facility if, for example, the user of the mobile terminal has been located in the facility less than the stay determination time, such as the case of simply passing through the facility.

According to an aspect of the invention, in the above information distribution system of the present invention, it is preferable that a stay determination time is stored in correspondence with each facility or each facility type in the stay determination time storage unit.

According to this configuration, a stay determination time is stored for each facility or each facility type in the stay determination time storage unit, and therefore the visit determination unit can determine, for each facility or facility type, whether the user of the mobile terminal has visited the facility in the evaluation information.

According to an aspect of the invention, in the above information distribution system of the present invention, it is preferable that the mobile terminal is a navigation apparatus able to perform navigation from the current location of the mobile terminal to a destination or a stopover, and the visit determination unit determines that the user of the mobile terminal to which the evaluation information has been distributed has visited the facility in the evaluation information based on setting information indicating the facility in the evaluation information that has been set as the destination or the stopover by the user of the mobile terminal.

According to this configuration, the visit determination unit can determine whether the user of the mobile terminal has visited the facility in the evaluation information by merely setting whether the facility in the evaluation information as a destination or stopover by the user of the mobile terminal.

According to an aspect of the invention, in the above information distribution system of the present invention, it is preferable that the information distribution system further includes: a map information storage unit that stores map information; a display unit that displays a facility in evaluation information stored in the evaluation information storage unit on a map in the map information; and a display control unit that, if a display range of the map displayed by the display unit has been reduced, controls whether the facility in the evaluation information is displayed on the map in accordance with whether the distribution range of the facility in the evaluation information displayed in the display range is greater than or equal to a threshold value.

According to this configuration, if the display range of the map displayed by the display unit has been reduced, the display control unit controls whether the facility in the evaluation information is displayed on the map in accordance with whether the distribution range of the facility in the evaluation information displayed in the display range is greater than or equal to the threshold value. Accordingly, for example, the display control unit can perform control so that, when the display range of the map has been reduced, the facility in the evaluation information is displayed on the map if the distribution range of the facility in the evaluation information is greater than or equal to the threshold value, and the facility in the evaluation information is not displayed on the map if the distribution range of the facility in the evaluation information is less than the threshold value. Therefore, even if the display range of the map has been reduced, facilities having beneficial evaluation information can continue to be displayed on the map.

According to an aspect of the invention, an information distribution method of the present invention for achieving the above aim includes: a location information acquisition step in which a location information acquisition unit included in a computer acquires terminal location information indicating the current location of a mobile terminal a location information update step in which a location information update unit included in the computer, by referencing a location information storage unit that stores the terminal location information, updates terminal location information stored in the location information storage unit to terminal location information that has been acquired in the location information acquisition step; an evaluation information distribution step in which an evaluation information distribution unit included in the computer, by referencing an evaluation information storage unit that stores evaluation information indicating an evaluation of a facility and stores distribution range information indicating a distribution range from the facility for distributing the evaluation information to the mobile terminal, distributes the evaluation information to the mobile terminal if the current location of the mobile terminal indicated by the terminal location information is within the distribution range indicated by the distribution range information; a visit determination step in which a visit determination unit included in the computer, by referencing a distribution information storage unit that stores distribution time terminal location information indicating the location of the mobile terminal at a time when the evaluation information was distributed to the mobile terminal in the evaluation information distribution step, and based on the terminal location information or on setting information indicating a facility that a user of the mobile terminal has set as a navigation destination or stopover, determines whether the user of the mobile terminal to which the evaluation information has been distributed has visited the facility in the evaluation information, and upon determining that the user of the mobile terminal has visited the facility in the evaluation information, calculates a visit distance indicating the distance between the location of the mobile terminal indicated by the distribution time terminal location information and the location of the facility in the evaluation information; a distribution range evaluation step in which a distribution range evaluation unit included in the computer determines whether the distribution range is effective based on the visit distance; and a distribution range change step in which a distribution range change unit included in the computer updates the distribution range information so that the distribution range is enlarged if the distribution range has been determined to be effective in the distribution range evaluation step, and updates the distribution range information so that the distribution range is reduced if the distribution range has been determined to not be effective in the distribution range evaluation step.

According to an aspect of the invention, an information distribution program of the present invention for achieving the above aim is an information distribution program for causing a computer including a location information storage unit that stores terminal location information indicating the current location of a mobile terminal and an evaluation information storage unit that stores evaluation information indicating an evaluation of a facility and stores distribution range information indicating a distribution range from the facility for distributing the evaluation information to the mobile terminal, to perform: a location information acquisition process of acquiring terminal location information indicating the current location of a mobile terminal; a location information update process of updating terminal location information stored in the location information storage unit to terminal location information that has been acquired in the location information acquisition process; and an evaluation information distribution process of distributing the evaluation information to the mobile terminal if the current location of the mobile terminal indicated by the terminal location information is within the distribution range indicated by the distribution range information, wherein the computer can access a distribution information storage unit that stores distribution time terminal location information indicating the location of the mobile terminal at a time when the evaluation information was distributed to the mobile terminal in the evaluation information distribution process, and the information distribution program causes the computer to further perform: a visit determination process of, based on the terminal location information or on setting information indicating a facility that a user of the mobile terminal has set as a navigation destination or stopover, determining whether the user of the mobile terminal to which the evaluation information has been distributed has visited the facility in the evaluation information, and upon determining that the user of the mobile terminal has visited the facility in the evaluation information, calculating a visit distance indicating the distance between the location of the mobile terminal indicated by the distribution time terminal location information and the location of the facility in the evaluation information; a distribution range evaluation process of determining whether the distribution range is effective based on the visit distance; and a distribution range change process of updating the distribution range information so that the distribution range is enlarged if the distribution range has been determined to be effective in the distribution range evaluation process, and updating the distribution range information so that the distribution range is reduced if the distribution range has been determined to not be effective in the distribution range evaluation process.

Note that the information distribution method and the information distribution program of the present invention obtain the same effects as the information distribution system.

As described above, an information distribution system, an information distribution method, and an information distribution program of the present invention have the effect of determining whether a distribution range is effective based on the visit status of a user having a mobile terminal who has visited a facility in evaluation information, enlarging the distribution range if the distribution range is effective, and reducing the distribution range if the distribution range is not effective.

Below is a detailed description of specific embodiments of the present invention with reference to the drawings.

Embodiment 1

FIG. 1 is a block diagram showing a schematic configuration of a communication system 1 according to the present embodiment. Specifically, the communication system 1 according to the present embodiment includes mobile terminals 2a and 2b and an information distribution apparatus (information distribution system) 3. The mobile terminals 2a and 2b and the information distribution apparatus 3 are interconnected via the Internet N. The mobile terminals 2a and 2b are portable terminals such as a mobile phone, a PHS (Personal Handyphone System), or a PDA (Personal Digital Assistance), or are a navigation apparatus that can be mounted to a moving body such as vehicle. The information distribution apparatus 3 is an apparatus that distributes evaluation information indicating an evaluation of a facility to the mobile terminals 2a and 2b. Note that there are various types of facilities, such as a store, a parking lot, a fuelling station (gas station), tourist facility, a hospital, a movie theater, a library, a lodging house, a golf course, a ski resort, an amusement park, an art gallery, and a museum.

Although two mobile terminals 2a and 2b and one information distribution apparatus 3 are shown in FIG. 1 in order to simplify the description, the communication system 1 is constituted by an arbitrary number of mobile terminals 2a and 2b and information distribution apparatuses 3. Also, another terminal apparatus, a web server, a proxy server, a DNS (Domain Name System) server, a DHCP (Dynamic Host Configuration Protocol) server, and the like may exist in the communication system 1.

Note that in the following description, lowercase English letters have been added to members that have the same functions only when there is a need to distinguish between them, such as "mobile terminal 2a", and when there is no need for distinguishing between such members, or when they are referred to collectively, lowercase English letters are not used in the description, such as "mobile terminal 2".

Mobile Terminal Configuration

The mobile terminal 2a includes a current location measuring unit 21, a location information transmission unit 22, an evaluation information reception unit 23, an alert unit 24, an input unit 25, and an evaluation information transmission unit 26. The configuration of the mobile terminal 2b is the same as the configuration of the mobile terminal 2a.

The current location measuring unit 21 measures the current location of the mobile terminal 2a. Specifically, the current location measuring unit 21 includes, for example, a GPS (Global Positioning System) function, and the current location measuring unit 21 receives radio waves transmitted from a plurality of geodetic satellites (GPS satellites) and measures the current location of the mobile terminal 2a based on relative time differences between the received radio waves. Each time the current location of the mobile terminal 2a changes, the current location measuring unit 21 outputs, to the location information transmission unit 22, terminal location information indicating the current location of the mobile terminal 2a. The terminal location information includes a mobile terminal ID for uniquely identifying the mobile terminal 2a, and latitude information and longitude information that indicate the current location of the mobile terminal 2a. Note that although the example in which the current location measuring unit 21 includes the GPS function is described above, the present invention is not limited to this. Specifically, the current location measuring unit 21 may measure the current location of the mobile terminal 2a by receiving location information from a nearby mobile phone base station, wireless LAN access point, or the like with which the mobile terminal 2a can communicate. Also, the current location measuring unit 21 may measure the current location of the mobile terminal 2a by receiving location information from a road marker, an address marker, or the like. In other words, as long as the current location measuring unit 21 can measure the current location of the mobile terminal 2a, an arbitrary one of various methods can be employed.

The location information transmission unit 22 transmits the terminal location information output from the current location measuring unit 21 to the information distribution apparatus 3. In the present embodiment, the location information transmission unit 22 transmits the terminal location information to the information distribution apparatus 3 in real-time. Note that the location information transmission unit 22 may transmit the terminal location information to the information distribution apparatus 3 each time the mobile terminal 2a moves a certain distance or at a certain time interval.

The evaluation information reception unit 23 receives evaluation information that has been distributed from the information distribution apparatus 3. Specifically, if the current location of the mobile terminal 2a is within a distribution range from a facility, the information distribution apparatus 3 distributes evaluation information to the mobile terminal 2a, and the evaluation information reception unit 23 receives the distributed evaluation information. Note that distribution processing performed by the information distribution apparatus 3 is described later. The evaluation information reception unit 23 outputs the received evaluation information to the alert unit 24. Note that in addition to the evaluation information, the evaluation information reception unit 23 receives facility information that has been distributed by the information distribution apparatus 3, and outputs the received facility information to the alert unit 24.

The alert unit 24 alerts the evaluation information and the facility information that have been output from the evaluation information reception unit 23. The alert unit 24 is constituted from a voice synthesizing apparatus, a display apparatus (a liquid crystal display, an EL display, a plasma display, or a CRT display), or the like. Note that if the mobile terminal 2a is a navigation apparatus, the alert unit 24 is preferably a voice synthesizing apparatus. Accordingly, even while operating a vehicle, the user can perform so-called "eyes-free" (without the use of eyes) checking of evaluation information.

The input unit 25 allows the user to input an evaluation of a facility. For example, when the user has used a facility, the user inputs an evaluation of the used facility with use of the input unit 25. The input unit 25 is therefore constituted from an arbitrary input device such as a keyboard, a mouse, a numeric keypad, a tablet, a touch panel, or a voice recognizing apparatus. Note that if the mobile terminal 2a is a navigation apparatus, the input unit 25 is preferably a voice recognizing apparatus. Accordingly, even while operating a vehicle, the user can perform so-called "hands-free" (without the use of hands) input of an evaluation of a facility. The input unit 25 outputs the input evaluation of the facility to the evaluation information transmission unit 26 as evaluation information.

The evaluation information transmission unit 26 transmits the evaluation information to the information distribution apparatus 3. The evaluation information is thus accumulated in the information distribution apparatus 3. The accumulated evaluation information is stored in an evaluation information management table 35 in the information distribution apparatus 3 by, for example, a supervisor of the information distribution apparatus 3. Note that the evaluation information management table 35 is described later.

Meanwhile, the mobile terminal 2a is also realized by installing a program in an arbitrary computer such as a personal computer. Specifically, the current location measuring unit 21, the location information transmission unit 22, the evaluation information reception unit 23, the alert unit 24, the input unit 25, and the evaluation information transmission unit 26 are realized by a CPU of the computer operating in accordance with the program that realizes the functions of these units. Accordingly, the program for realizing the functions of the current location measuring unit 21, the location information transmission unit 22, the evaluation information reception unit 23, the alert unit 24, the input unit 25, and the evaluation information transmission unit 26, as well as a recording medium having the program recorded thereon are also embodiments of the present invention.

Information Distribution Apparatus Configuration for Distributing Evaluation Information to a Mobile Terminal The information distribution apparatus 3 includes a function for distributing evaluation information indicating an evaluation of a facility to the mobile terminal 2. The information distribution apparatus 3 therefore includes a location information reception unit 31, a location information management table 32, a location information update unit 33, a facility information management table 34, the evaluation information management table 35, an evaluation information extraction unit 36, a user information management table 37, and an evaluation information distribution unit 38.

The location information reception unit (location information acquisition unit) 31 receives terminal location information that has been transmitted from the mobile terminal 2. The location information reception unit 31 outputs the received terminal location information to the location information update unit 33.

The location information management table (location information storage unit) 32 stores the terminal location information indicating the current location of the mobile terminal 2. FIG. 2 is a diagram showing an exemplary data structure of the location information management table 32. In the example shown in FIG. 2, mobile terminal Ms, latitude information, longitude information, and last updated times are stored in the location information management table 32. A mobile terminal II) is an identification code for uniquely identifying the mobile terminal 2. If the mobile terminal 2 is, for example, an IP phone, the mobile terminal ID is an IP (Internet Protocol) address or a MAC (Media Access Control) address. The latitude information is information indicating the latitude in the current location of the mobile terminal 2. The longitude information is information indicating the longitude in the current location of the mobile terminal 2. A last updated time is the time when the location information update unit 33 last updated the latitude information and the longitude information.

The location information update unit 33 updates the terminal location information stored in the location information management table 32 to terminal location information received by the location information reception unit 31. Specifically, the location information update unit 33 extracts a mobile terminal ID, latitude information, and longitude information from terminal location information that has been output from the location information reception unit 31. Based on the extracted mobile terminal ID, the location information update unit 33 updates the latitude information and longitude information stored in the location information management table 32 to the extracted latitude information and longitude information. The location information update unit 33 writes, as a last updated time in the location information management table 32, the time when the latitude information and longitude information were updated.

The facility information management table (facility information storage unit) 34 stores facility information for identifying facilities, and facility location information indicating a location range of such facilities. FIG. 3 is a diagram showing an exemplary data structure of the facility information management table 34. In the example shown in FIG. 3, facility IDs, facility type IDs, facility names, latitude information, longitude information, facility location ranges, and facility addresses are stored in the facility information management table 34. A facility ID is an identification code for uniquely identifying a facility. A facility type ID is an identification code for uniquely identifying a type of facility. A facility name is the name of a facility: The latitude information is information indicating the latitude in the location of a facility. The longitude information is information indicating the longitude in the location of a facility. A facility location range indicates a radius from a central location of a facility indicated by the latitude information and longitude information. In the present embodiment, the facility location ranges are indicated in units of meters (m). Here, each facility location range has been set so that, for example, all buildings pertaining to the facility are included in the radius. A facility address indicates the address of a facility. Note that a facility ID, a facility type ID, and a facility name such as are described above are included in the facility information. Also, latitude information, longitude information, and a facility location range such as are described above are included in the facility location information.

The evaluation information management table (evaluation information storage unit) 35 stores evaluation information indicating evaluations of facilities, and distribution range information indicating distribution ranges from the facilities for distributing the evaluation information to the mobile terminal 2. FIG. 4 is a diagram showing an exemplary data structure of the evaluation information management table 35. In the example shown in FIG. 4, evaluation IDs, facility IDs, evaluation comments, and distribution ranges are stored in the evaluation information management table 35. An evaluation ID is an identification code for uniquely identifying evaluation information. An evaluation comment is a comment indicating an evaluation of a facility. A distribution range is a distribution range from the central location of a facility for distributing evaluation information to the mobile terminal 2. In the present embodiment, the distribution ranges are indicated in units of kilometers (km). Note that an evaluation ID and an evaluation comment as are described above are included in evaluation information. Also, a distribution range as is described above is included in distribution range information.

If the current location of the mobile terminal 2 indicated by the terminal location information is within the distribution range of a facility indicated by the distribution range information, the evaluation information extraction unit 36 extracts the evaluation information indicating the facility from the evaluation information management table 35. Specifically, the evaluation information extraction unit 36 first extracts the terminal location information stored in the location information management table 32. The evaluation information extraction unit 36 then determines whether the current location of the mobile terminal 2 indicated by the extracted terminal location information is within the distribution range of the facility indicated by the distribution range information. Upon determining that the current location of the mobile terminal 2 is within the distribution range of the facility the evaluation information extraction unit 36 extracts evaluation information indicating the facility from the evaluation information management table 35 based on the facility ID indicated by the facility information. The evaluation information extraction unit 36 then outputs the extracted evaluation information to the evaluation information distribution unit 38 along with the terminal location information and facility information.

The user information management table 37 stores information on the user of the mobile terminal 2. FIG. 5 is a diagram showing an exemplary data structure of the user information management table 37. In the example shown in FIG. 5, mobile terminal IDs, usernames, and email addresses are stored in the user information management table 37. A username is the name of a user. An email address is the email address of the mobile terminal 2. The mobile terminal IDs, usernames, and email addresses stored in the user information management table 37 have been preset by the supervisor of the information distribution apparatus 3.

The evaluation information distribution unit 38 distributes the evaluation information output from the evaluation information extraction unit 36 to a mobile terminal 2 located in the distribution range of the facility indicated in the evaluation information.

Specifically, the evaluation information distribution unit 38 first determines whether an evaluation ID in the evaluation information and a mobile terminal ID in the terminal location information are stored in the same record in a distribution information management table 41 (see FIG. 9) that is described later. Upon determining that the evaluation ID and the mobile terminal ID are stored in the same record in the distribution information management table 41, the evaluation information distribution unit 38 determines that the evaluation information has already been distributed to the mobile terminal 2. In this case, the evaluation information distribution unit 38 does not distribute the evaluation information to the mobile terminal 2.

However, upon determining that the evaluation ID and the mobile terminal ID are not stored in the same record in the distribution information management table 41, the evaluation information distribution unit 38 determines that the evaluation information has not yet been distributed to the mobile terminal 2. In this case, the evaluation information distribution unit 38 extracts an email address stored in the user information management table 38 based on the mobile terminal ID indicated by the terminal location information. The evaluation information distribution unit 38 then distributes the evaluation information to the mobile terminal 2 along with the facility information based on the extracted email address. The evaluation information distribution unit 38 then writes the evaluation 11) and the mobile terminal ID to the distribution information management table 41. Also, the evaluation information distribution unit 38 writes terminal location information indicating the location of the mobile terminal 2 at the time when the evaluation information was distributed to the mobile terminal 2, to the distribution information management table 41 as distribution time terminal location information. Furthermore, the evaluation information distribution unit 38 writes the time when the evaluation information was distributed to the mobile terminal 2 to the distribution information management table 41.

Take the example in which the evaluation information distribution unit 38 has distributed, to the mobile terminal 2a, evaluation information for a convenience store with the facility name "AAA" (facility ID "C0001"). FIG. 6 is a conceptual diagram showing an example of evaluation information displayed by the alert unit 24 in the mobile terminal 2a. As shown in FIG. 6, From "info@example.co.jp", To "a001@example.co.jp", and Subject "Information about convenience store 'AAA'" are displayed by the alert unit 24. Note that the email address displayed after "From" is the email address of the information distribution apparatus 3 that is the distribution source. The email address displayed after "To" is the email address of the mobile terminal 2a that is the distribution destination. Also, the evaluation information "Convenience store 'AAA' has a wide variety of rice balls. Give it a try." is displayed by the alert unit 24.

Take another example in which the evaluation information distribution unit 38 has distributed, to the mobile terminal 2a, evaluation information for a gas station with the facility name "CCC" (facility ID "G0001"). FIG. 7 is a conceptual diagram showing an example of evaluation information displayed by the alert unit 24 in the mobile terminal 2a. As shown in FIG. 7, From "info@example.co.jp", To "a001@example.co.jp", and Subject "Information about gas station 'AAA'" are displayed by the alert unit 24. Also, the evaluation information "The gas is always cheap at gas station 'CCC'. Give it a try." is displayed by the alert unit 24.

Information Distribution Apparatus Configuration for Determining Whether a Distribution Range is Effective The evaluation information distribution apparatus 3 furthermore includes a function for determining whether a distribution range stored in the evaluation information management table 35 is effective. The evaluation information distribution apparatus 3 therefore furthermore includes a facility information extraction unit 39, a stay determination time management table 40, the distribution information management table 41, a visit determination unit 42, a distribution range evaluation unit 43, and a distribution range change unit 44.

If the current location of the mobile terminal 2 indicated by the terminal location information is within the location range of a facility indicated by the facility location information, the facility information extraction unit 39 extracts the facility information indicating the facility from the facility information management table 34. Specifically, the facility information extraction unit 39 first extracts the terminal location information stored in the location information management table 32. The facility information extraction unit 39 then determines whether the current location of the mobile terminal 2 indicated by the extracted terminal location information is within the location range of the facility indicated by the facility location information. Upon determining that the current location of the mobile terminal 2 is within the location range of the facility; the facility information extraction unit 39 extracts the facility information indicating the facility from the facility information management table 34. The facility information extraction unit 39 outputs the extracted facility information to the visit determination unit 42 along with the terminal location information.

The stay determination time management table (stay determination time storage unit) 40 stores stay determination times that are threshold values for determining whether the user of the mobile terminal 2 is staying at the facility indicated by the facility information extracted by the facility information extraction unit 39. FIG. 8 is a diagram showing an exemplary data structure of the stay determination time management table 40. In the example shown in FIG. 8, facility type IDs, facility type names, and stay determination times are stored in the stay determination time management table 40. A facility type name is the name of a facility type. In the present embodiment, "convenience store", "gas station", and "parking lot" are stored as facility type names. A stay determination time is stored for each type of facility, and is a time that is a threshold value for determining whether the user of the mobile terminal 2 is staying at a facility. In the present embodiment, the stay determination times are indicated in units of seconds.

Note that although the example in which stay determination times are stored in correspondence with facility types in the stay determination time management table 40 is described above, the present invention is not limited to this. For example, stay determination times may be stored in correspondence with facilities in the stay determination time management table 40.

The distribution information management table (distribution information storage unit) 41 stores distribution time terminal location information indicating the location of the mobile terminal 2 when the evaluation information distribution unit 38 distributed evaluation information to the mobile terminal 2, visit information indicating whether the user of the mobile terminal 2 visited a facility, and visit distance information indicating a visit distance. FIG. 9 is a diagram showing an exemplary data structure of the distribution information management table 41. In the example shown in FIG. 9, evaluation IDs, mobile terminal IDs, distribution time latitude information, distribution time longitude information, distribution times, visit states, and visit distances are stored in the distribution information management table 41. The distribution time latitude information is information indicating the latitude in the location of the mobile terminal 2 when evaluation information was distributed to the mobile terminal 2. The distribution time longitude information is information indicating the longitude in the location of the mobile terminal 2 when evaluation information was distributed to the mobile terminal 2. A distribution time is a time when evaluation information was distributed to the mobile terminal 2. A visit state indicates whether the user of the mobile terminal 2 has visited a facility. In the present embodiment, "true" is stored as the visit state if the user of the mobile terminal 2 has visited a facility. On the other hand, "false" is stored as the visit state if the user of the mobile terminal 2 has not visited a facility. A visit distance is a distance between the location of the mobile terminal 2 indicated by the distribution time terminal location information, and the location of a facility. In the present embodiment, the distribution distances are indicated in units of kilometers (km). Note that distribution time latitude information and distribution time longitude information as are described above are included in the distribution time terminal location information. Also, a visit state as is described above is included in the visit information. Furthermore, a visit distance as is described above is included in the visit distance information.

If the current location of the mobile terminal 2 indicated by the terminal location information is within the location range of the facility indicated by the facility location information for at least the stay determination time, the visit determination unit 42 determines that the user of the mobile terminal 2 has visited the facility indicated by the facility information extracted by the facility information extraction unit 39.

Specifically, the visit determination unit 42 extracts facility location information stored in the facility information management table 34 based on a facility ID indicated by the facility information output from the facility information extraction unit 39. Also, the visit determination unit 42 extracts a stay determination time stored in the stay determination time management table 40 based on a facility type ID indicated by the facility information output from the facility information extraction unit 39. By setting the time when the current location of the mobile terminal 2 indicated by the terminal location information output from the facility information extraction unit 39 was within the location range of the facility indicated by the facility location information as the start and counting (measuring) with use of a timer, the visit determination unit 42 determines whether the current location of the mobile terminal 2 has been within the location range of the facility for at least the stay determination time. Note that the result of the counting by the timer is stored in a memory not shown in the figures.

Upon determining that the current location of the mobile terminal 2 has been within the location range of the facility for at least the stay determination time, the visit determination unit 42 determines that the user of the mobile terminal 2 has visited (stayed at) the facility indicated by the facility information extracted by the facility information extraction unit 39. In this case, the visit determination unit 42 writes "true", which indicates that the user of the mobile terminal 2 has visited the facility, in the distribution information management table 41. At this time, the visit determination unit 42 calculates a visit distance indicating the distance between the location of the mobile terminal 2 indicated by the distribution time terminal location information and the location of the facility indicated by the facility location information. The visit determination unit 42 writes the calculated visit distance in the distribution information management table 41. In other words, the visit determination unit 42 does not write "true" in the distribution information management table 41 if, for example, the user of the mobile terminal 2 simply passes through the facility without staying there.

Also, the visit determination unit 42 extracts a record from the distribution information management table 41 each time a predetermined time has elapsed; if the visit state in the extracted record is not "true", the visit determination unit 42 compares the distribution time in the extracted record and the current time, and if the difference between these times is greater than or equal to a threshold value, the visit determination unit 42 determines that the user of the mobile terminal 2 has not visited the facility in the evaluation information. In other words, if a time period that is at least the threshold value has elapsed since the evaluation information was distributed to the mobile terminal 2, and furthermore the visit state in the extracted record is not "true", the visit determination unit 42 determines that the user of the mobile terminal 2 has not visited the facility in the evaluation information. In this case, the visit determination unit 42 writes "false", which indicates that the user of the mobile terminal 2 has not visited the facility, in the distribution information management table 41.

Note that before the visit determination unit 42 writes "true" or "false" as the visit state in the distribution information management table 41, "unknown" is stored as the default visit state in the distribution information management table 41.

The distribution range evaluation unit 43 determines whether the distribution range indicated by the distribution range information stored in the evaluation information management table 35 is effective based on visit distance information stored in the distribution information management table 41. In the present embodiment, the distribution range evaluation unit 43 determines that a distribution range is effective if the following equation 1 is satisfied. On the other hand, the distribution range evaluation unit 43 determines that the distribution range is not effective if the following equation 1 is not satisfied. Note that in the following equation 1, the visit distance sum is the sum of visit distances of users of mobile terminals 2 who have visited a facility in the evaluation information. The distribution user count is the number of users of mobile terminals 2 to which target evaluation information has been distributed. The visit expectation value is a percentage of the distribution user count, and indicates the percentage of users who can be expected to visit a facility. The distribution range is the distribution range corresponding to the target evaluation information.

$$\text{visit distance sum} \div (\text{distribution user count} \times \text{visit expectation value}) \geq \text{distribution range} \quad \text{Equation 1}$$

Take the example in which the distribution range evaluation unit 43 determines whether the distribution range "3" km corresponding to the evaluation ID "E0001" (see FIG. 4) is effective. Note that half or more of the distribution user count is expected to visit the facility, and the visit expectation value is assumed to be 50% (0.5). Here, the mobile terminal IDs "A001", "A002", and "A003" are stored in correspondence with the evaluation ID "E0001" in the distribution information management table 41 (see FIG. 9). The distribution range evaluation unit 43 therefore calculates a distribution user count of "3". Also, the visit state "true" is stored in correspondence with the mobile terminal IDs "A001" and "A002" in the distribution information management table 41. Also, the visit state "false" is stored in correspondence with the mobile terminal ID "A003" in the distribution information management table 41. The distribution range evaluation unit 43 therefore determines that the users of the mobile terminals 2 indicated by the mobile terminal IDs "A001" and "A002" have visited the facility in the evaluation information, and the user of the mobile terminal indicated by the mobile terminal ID "A003" has not visited the facility in the evaluation information. Furthermore, the visit distance "3" is stored in correspondence with the mobile terminal IDs "A001" and "A002" in the distribution information management table 41. The distribution range evaluation unit 43 therefore calculates a visit distance sum of "6". Applying these results to the equation 1 yields 6÷(3×0.5)≥3. In other words, 4≥3 is yielded. Since the equation 1 is satisfied, the distribution range evaluation unit 43 determines that the distribution range "3" km in correspondence with the evaluation ID E0001" is effective.

Take another example in which the distribution range evaluation unit 43 determines whether the distribution range "10" km corresponding to the evaluation ID "E0002" (see FIG. 4) is effective. Note that half or more of the distribution user count is expected to visit the facility, and the visit expectation value is assumed to be 50% (0.5). Here, the mobile terminal IDs "A001" and "A002" are stored in correspondence with the evaluation ID "E0002" in the distribution information management table 41 (see FIG. 9). The distribution range evaluation unit 43 therefore calculates a distribution user count of "2". Also, the visit state "true" is stored in correspondence with the mobile terminal ID "A001" in the distribution information management table 41. Also, the visit state "false" is stored in correspondence with the mobile terminal ID "A002" in the distribution information management table 41. The distribution range evaluation unit 43 therefore determines that the user of the mobile terminal 2 indicated by the mobile terminal ID "A001" has visited the facility in the evaluation information, and the user of the mobile terminal 2 indicated by the mobile terminal ID "A002" has not visited the facility in the evaluation information. Furthermore, the visit distance "8" is stored in correspondence with the mobile terminal ID "A001" in the distribution information management table 41. The distribution range evaluation unit 43 therefore calculates a visit distance sum of "8". Applying these results to the equation 1 yields 8÷(2×0.5)≥10. In other words, 8≥10 is yielded. Since the equation 1 is not satisfied, the distribution range evaluation unit 43 determines that the distribution range "10" km in correspondence with the evaluation ID "E0002" is not effective.

In other words, in the present embodiment, the distribution range evaluation unit 43 determines that a distribution range is effective if the equation 1 is satisfied. Specifically, if the equation 1 is satisfied, users of mobile terminals 2 to which evaluation information has been distributed have visited the facility in the evaluation information from a long distance. Therefore, in such a case, there is a high possibility that the evaluation information is beneficial evaluation information. Thus, the distribution range evaluation unit 43 can determine that the distribution range is effective. On the other hand, the distribution range evaluation unit 43 determines that the distribution range is not effective if the equation 1 is not satisfied. Specifically, if the equation 1 is not satisfied, users of mobile terminals 2 to which evaluation information has been distributed have visited the facility in the evaluation information from a short distance, or users of mobile terminals 2 to which evaluation information has been distributed have not visited the facility in the evaluation information. Therefore, in such a case, there is a high possibility that the evaluation information is not beneficial evaluation information. Thus, the distribution range evaluation unit 43 can determine that the distribution range is not effective.

Note that although the distribution range evaluation unit 43 determines whether the distribution range is effective in real-time in the present embodiment, the present invention is not limited to this. For example, the distribution range evaluation unit 43 may determine whether the distribution range is effective each time a constant time period has elapsed. In other words, the distribution range evaluation unit 43 can determine whether the distribution range is effective at an arbitrary timing.

Also, the example in which the distribution range evaluation unit 43 determines that the distribution range is effective if the equation 1 is satisfied and determines that the distribution range is not effective if the equation 1 is not satisfied is described above, but the present invention is not limited to this. In other words, the opposite is also possible. Specifically, the distribution range evaluation unit 43 determines that the distribution range is not effective if the equation 1 is satisfied, and determines that the distribution range is effective if the equation 1 is not satisfied. In other words, in the exemplary case in which the mobile terminal 2 is a navigation apparatus, and the evaluation information is, for example, transportation information indicating traffic information, it can be said that the evaluation information of a facility such as a toll booth is more beneficial when fewer users of mobile terminals 2 have visited the facility.

If the distribution range evaluation unit 43 has determined that the distribution range is effective, the distribution range change unit 44 updates the distribution range information stored in the evaluation information management table 35 so that the distribution range is enlarged. In the present embodiment, the distribution range change unit 44 updates the distribution range information so that the distribution range is enlarged by "1" km. On the other hand, if the distribution range evaluation unit 43 has determined that the distribution range is not effective, the distribution range change unit 44 updates the distribution range information stored in the evaluation information management table 35 so that the distribution range is reduced. In the present embodiment, the distribution range change unit 44 updates the distribution range information so that the distribution range is reduced by "1" km.

For example, if the distribution range evaluation unit 43 has determined that the distribution range "3" km in correspondence with the evaluation ID "E0001" is effective, the distribution range change unit 44 updates the distribution range information so that the distribution range is changed from "3" km to "4" km. Also, if the distribution range evaluation unit 43 has determined that the distribution range "10" km in correspondence with the evaluation ID "E0002" is not effective, the distribution range change unit 44 updates the distribution range information so that the distribution range is changed from "10" km to "9" km. FIG. 10 is a diagram showing an exemplary data structure of the evaluation information management table 35 that has been updated by the distribution range change unit 44. Compared to the evaluation information management table 35 shown in FIG. 4, in the evaluation information management table 35 shown in FIG. 10, the distribution range in correspondence with the evaluation ID "E0001" has been updated to "4", and the distribution range in correspondence with the evaluation ID "E0002" has been updated to "9".

Note that the information distribution apparatus 3 is also realized by installing a program in an arbitrary computer such as a personal computer. Specifically, the location information reception unit 31, the location information update unit 33, the evaluation information extraction unit 36, the evaluation information distribution unit 38, the facility information extraction unit 39, the visit determination unit 42, the distribution range evaluation unit 43, and the distribution range change unit 44 are realized by a CPU of the computer operating in accordance with the program that realizes the functions of these units. Accordingly, the program for realizing the functions of the location information reception unit 31, the location information update unit 33, the evaluation information extraction unit 36, the evaluation information distribution unit 38, the facility information extraction unit 39, the visit determination unit 42, the distribution range evaluation unit 43, and the distribution range change unit 44, as well as a recording medium having the program recorded thereon are also embodiments of the present invention. Also, the location information management table 32, the facility information management table 34, the evaluation information management table 35, the user information management table 37, the stay determination time management table 40, and the distribution information management table 41 are embodied by an internal storage apparatus of the computer or a storage apparatus that can be accessed from the computer.

Note that the members 31 to 44 that constitute the information distribution apparatus 3 may be constituted collectively in a single apparatus, or may be constituted separately in a plurality of apparatuses. For example, in the case in which the mobile terminal 2 is a navigation apparatus included in a moving body such as a vehicle, members that are included in the information distribution apparatus 3, such as the facility information management table 34, the facility information extraction unit 39, the stay determination time management table 40, and the visit determination unit 42, may be included in the mobile terminal 2.

Example of Operations in the Communication System

The following describes operations performed in the communication system 1 having the configuration described above, with reference to FIGS. 11 to 14.

Figure 11:
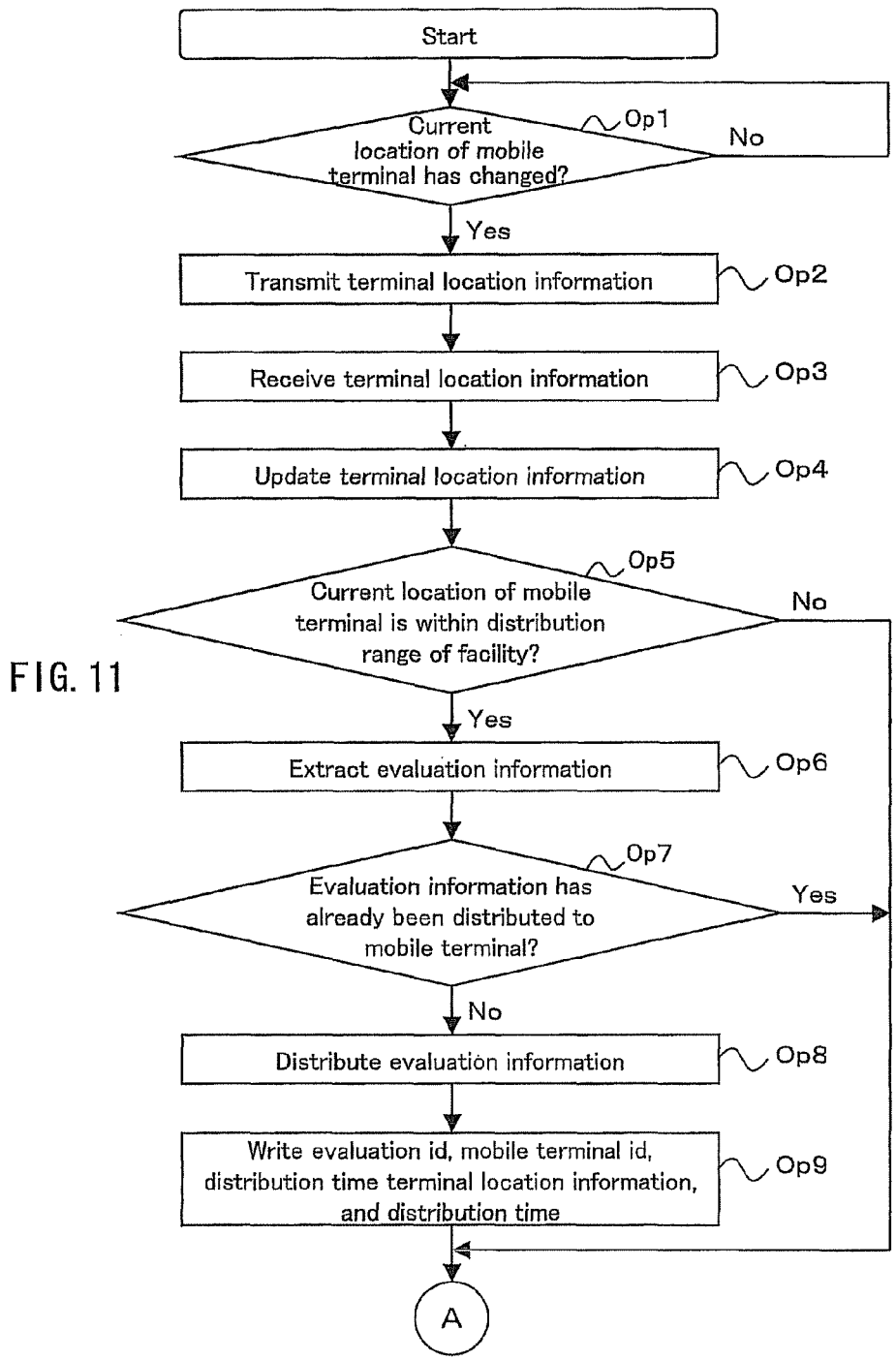
FIG. 11 is a flowchart showing an example of operations performed in the communication system in which the mobile terminal transmits terminal location information to the information distribution apparatus, and the information distribution apparatus distributes evaluation information to the mobile terminal.
Figure 12:
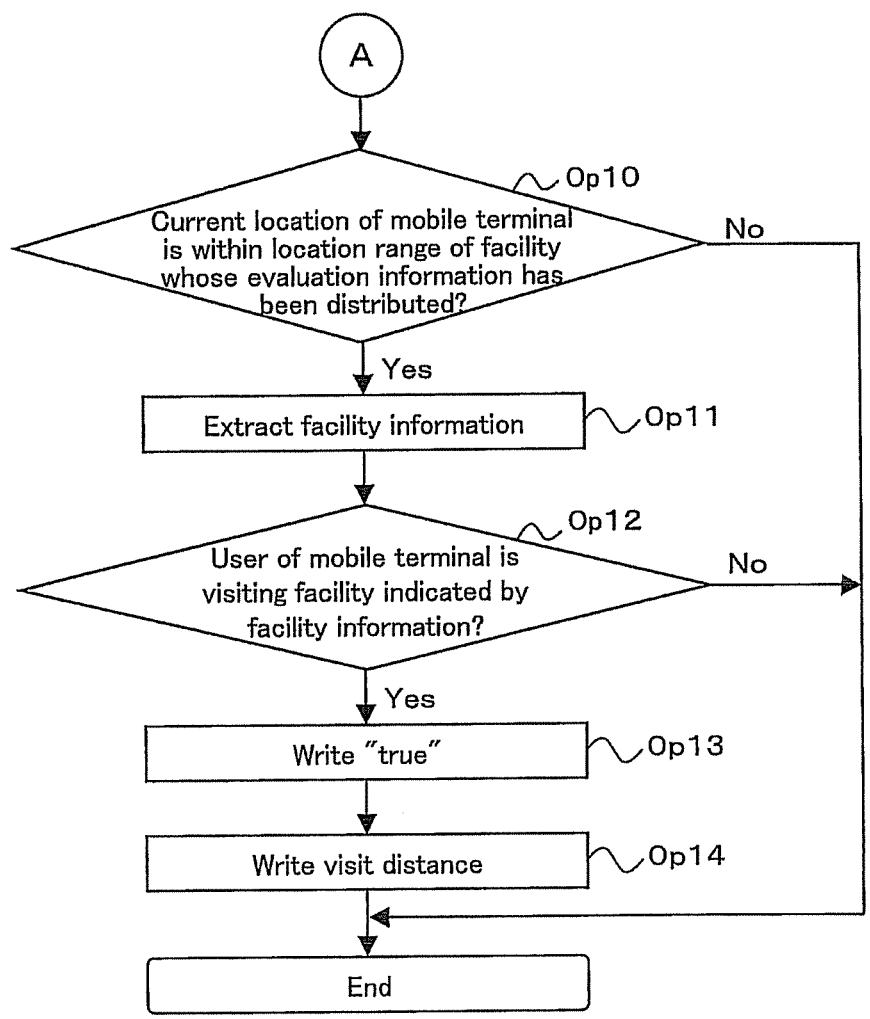
FIG. 12 is a flowchart showing an example of operations performed in the communication system for determining whether a user of the mobile terminal has visited a facility in the evaluation information after the processing shown in FIG. 11.

FIGS. 11 and 12 are flowcharts showing an example of operations performed in the communication system 1, in which the mobile terminal 2 transmits terminal location information to the information distribution apparatus 3, the information distribution apparatus 3 distributes evaluation information to the mobile terminal 2, and a determination is made as to whether the user of the mobile terminal 2 has visited the facility in the evaluation information. First, as shown in FIG. 11, if the current location of the mobile terminal 2 has changed (YES in step Op1), the current location measuring unit 21 outputs terminal location information indicating the current location of the mobile terminal 2 to the location information transmission unit 22. The location information transmission unit 22 transmits the terminal location information output from the current location measuring unit 21 to the information distribution apparatus 3 (step Op2). However, if the current location of the mobile terminal 2 has not changed (NO in step Op1), processing returns to step Opt.

Next, the location information reception unit 31 of the information distribution apparatus 3 receives the terminal location information transmitted in step Opt (step Op3). The location information update unit 33 updates the terminal location information stored in the location information management table 32 to the terminal location information received in step Op3 (step Op4).

Then, the evaluation information extraction unit 36 determines whether the current location of the mobile terminal 2 indicated by the terminal location information stored in the location information management table 32 is within the distribution range of the facility indicated by the distribution range information stored in the evaluation information management table 35 (step Op5). Upon determining that the current location of the mobile terminal 2 is within the distribution range of the facility (YES in step Op5), the evaluation information extraction unit 36 extracts evaluation information indicating the facility from the evaluation information management table 35 (step Op6). However, if the evaluation information extraction unit 36 determines that the current location of the mobile terminal 2 is not within the distribution range of the facility (NO in step Op5), processing proceeds to step Op10 in FIG. 12.

Then, the evaluation information distribution unit 38 determines whether the evaluation information extracted in step Op6 has already been distributed to the mobile terminal 2 (step Op7). If the evaluation information distribution unit 38 has determined that the evaluation information extracted in step Op6 has already been distributed to the mobile terminal 2 (YES in step Op7), processing proceeds to step Op10 in FIG. 12. However, upon determining that the evaluation information extracted in step Op6 has not yet been distributed to the mobile terminal 2 (NO in step Op7), the evaluation information distribution unit 38 distributes the evaluation information extracted in step Op6 to the mobile terminal 2 located in the distribution range of the facility indicated by the evaluation information, along with the facility information (step Op8).

The evaluation information distribution unit 38 then writes the evaluation ID, the mobile terminal ID, the distribution time terminal location information, and the distribution time to the distribution information management table 41 (step Op9).

Next, as shown in FIG. 12, the facility information extraction unit 39 determines whether the current location of the mobile terminal 2 indicated by the terminal location information stored in the location information management table 32 is within the location range of the facility indicated by the facility location information stored in the facility information management table 34 (step Op10). Upon determining that the current location of the mobile terminal 2 is within the location range of the facility (YES in step Op 10), the facility information extraction unit 39 extracts the facility information indicating the facility from the facility information management table 34 (step Op11). However, if the facility information extraction unit 39 has determined that the current location of the mobile terminal 2 is not within the location range of the facility (NO in step Op10), the processing of FIG. 12 ends.

Next, the visit determination unit 42 determines whether the current location of the mobile terminal 2 indicated by the terminal location information has been within the location range of the facility indicated by the facility location information for at least the stay determination time (step Op12). Upon determining that the current location of the mobile terminal 2 has been within the location range of the facility for at least the stay determination time (YES in step Op 12), the visit determination unit 42 determines that the user of the mobile terminal 2 has visited the facility indicated by the facility information extracted in step Op 11. In this case, the visit determination unit 42 writes "true", which indicates that the user of the mobile terminal 2 has visited the facility, in the distribution information management table 41 (step Op 13). At this time, the visit determination unit 42 calculates a visit distance indicating the distance between the location of the mobile terminal 2 indicated by the distribution time terminal location information and the location of the facility indicated by the facility location information, and writes the calculated visit distance in the distribution information management table 41 (step Op14).

However, if the visit determination unit 42 has determined that the current location of the mobile terminal 2 has not been within the location range of the facility for at least the stay determination time (NO in step Op 12), the processing of FIG. 12 ends.

Figure 13:
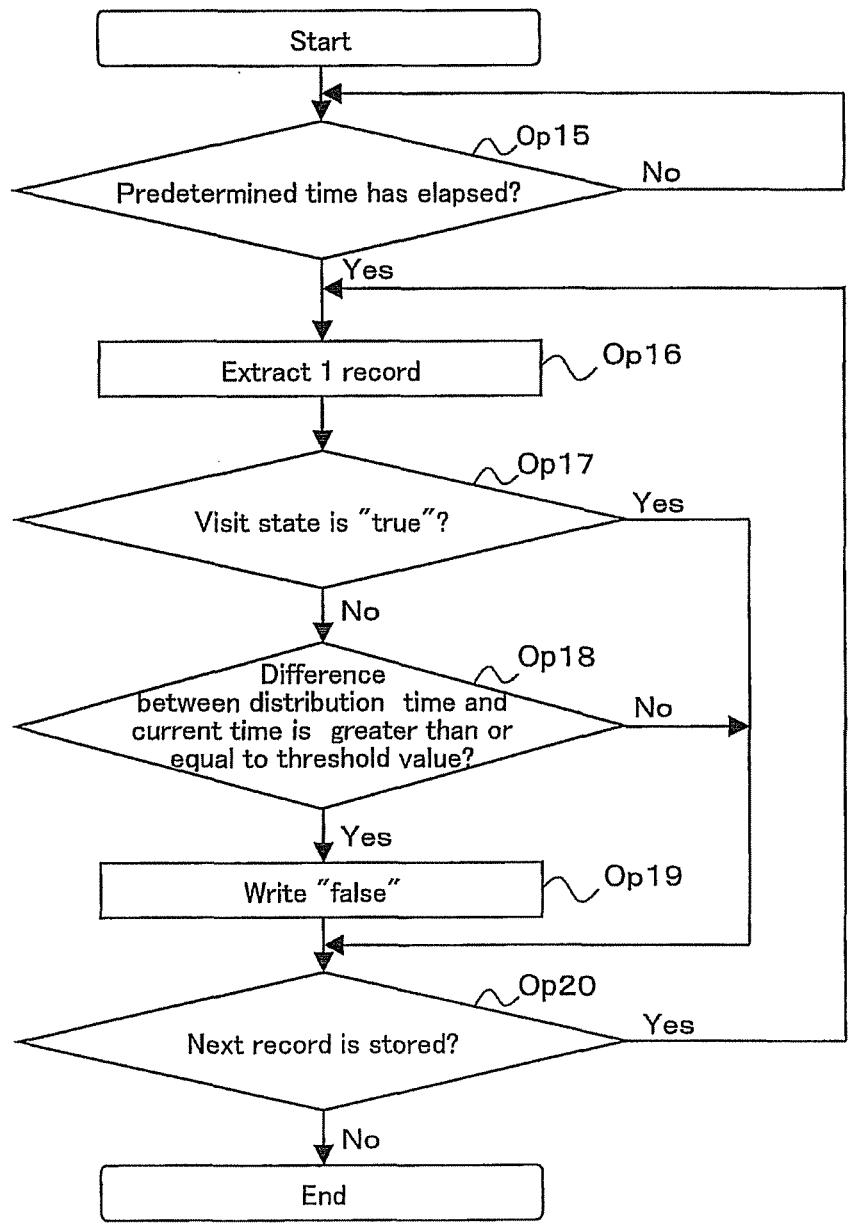
FIG. 13 is a flowchart showing an example of operations performed by the information distribution apparatus in the case in which it has been determined that the user of the mobile terminal has not visited the facility in the evaluation information.

FIG. 13 is a flowchart showing exemplary operations performed by the information distribution apparatus 3 in the case of a determination that the user of the mobile terminal 2 has not visited the facility in the evaluation information. As shown in FIG. 13, the visit determination unit 42 first determines whether a predetermined time has elapsed (step Op15). Upon determining that the predetermined time has elapsed (YES in step Op15), the visit determination unit 42 extracts the first record from the distribution information management table 41 (step Op16). However, if the visit determination unit 42 has determined that the predetermined time has not elapsed (NO in step Op 15), processing returns to step Op 15. Note that the predetermined time is pre-stored in a memory of the visit determination unit 42 that is not shown in the drawings.

The visit determination unit 42 then determines whether the visit state in the record extracted in step Op16 is "true" (step Op17). Upon determining that the visit state in the record is not "true" (NO in step Op17), the visit determination unit 42 determines whether the difference between the distribution time in the record and the current time is greater than or equal to a threshold value (step Op18). However, if the visit determination unit 42 has determined that the visit state in the record is "true" (YES in step Op17), processing proceeds to step Op20. Note that the threshold value may be pre-stored in the memory of the visit determination unit 42 that is not shown in the drawings, or may be dynamically calculated in accordance with the distance between the location of the mobile terminal 2 indicated by the distribution time terminal location information and the location of the facility.

Then, upon determining that the difference between the distribution time in the record and the current time is greater than or equal to the threshold value (YES in step Op 18), the visit determination unit 42 determines that the user of the mobile terminal 2 has not visited the facility in the evaluation information, and writes "false", which indicates that the user of the mobile terminal 2 has not visited the facility, in the distribution information management table 41 (step Op 19). However, if the visit determination unit 42 has determined that the difference between the distribution time in the record and the current time is less than the threshold value (NO in step Op18), processing proceeds to step Op20.

The visit determination unit 42 then determines whether a next record is stored in the distribution information management table 41 (step Op20). If the visit determination unit 42 has determined that a next record is stored in the distribution information management table 41 (YES in step Op20), processing returns to step Op 16, and the visit determination unit 42 extracts the next record from the distribution information management table 41. However, if the visit determination unit 42 has determined that a next record is not stored in the distribution information management table 41 (NO in step Op20), the processing of FIG. 13 ends.

Figure 14:
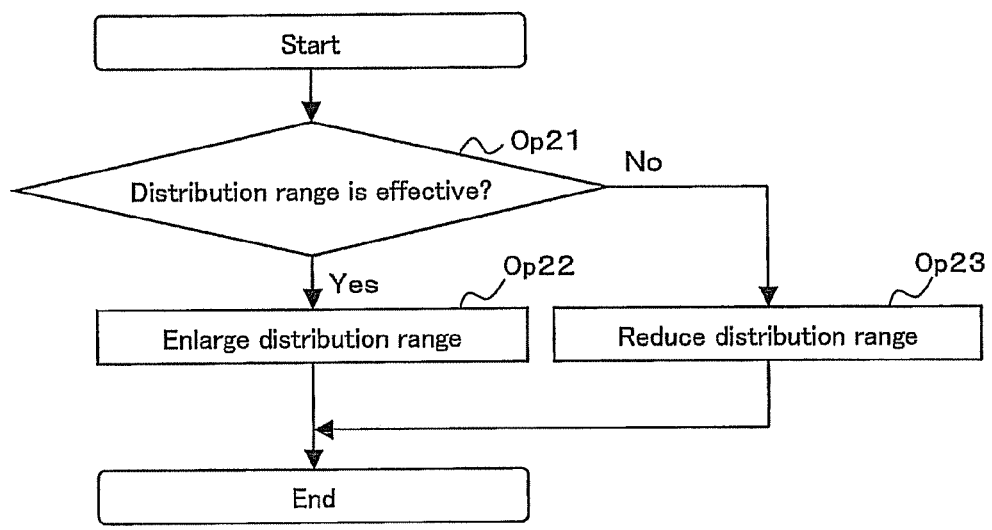
FIG. 14 is a flowchart showing an example of operations performed by the information distribution apparatus for enlarging the distribution range if the distribution range is effective, and reducing the distribution range if the distribution range is not effective.

FIG. 14 is a flowchart showing an example of operations performed by the information distribution apparatus 3 for enlarging the distribution range if the distribution range is effective, and reducing the distribution range if the distribution range is not effective. As shown in FIG. 14, the distribution range evaluation unit 43 extracts the visit distance information stored in the distribution information management table 41 at an arbitrary timing, and determines whether the distribution range indicated by the distribution range information stored in the evaluation information management table 35 is effective based on the extracted visit distance information (step Op21). Effectiveness is determined by using, for example, the equation 1. If the distribution range evaluation unit 43 has determined that the distribution range is effective (YES in step Op21), the distribution range change unit 44 updates the distribution range information stored in the evaluation information management table 35 so that the distribution range is enlarged (step Op22). However, if the distribution range evaluation unit 43 has determined that the distribution range is not effective (NO in step Op21), the distribution range change unit 44 updates the distribution range information stored in the evaluation information management table 35 so that the distribution range is reduced (step Op23).

As described above, according to the communication system 1 of the present embodiment, the visit determination unit 42 determines whether the user of the mobile terminal 2 to which evaluation information has been distributed has visited the facility in the evaluation information based on the terminal location information indicating the current location of the mobile terminal 2. Upon determining that the user of the mobile terminal 2 to which the evaluation information has been distributed has visited the facility in the evaluation information, the visit determination unit 42 calculates a visit distance indicating the distance between the location of the mobile terminal indicated by the distribution time terminal location information and the location of the facility in the evaluation information. The distribution range evaluation unit 43 determines whether the distribution range is effective based on the visit distance. In the case of a determination that the distribution range is effective, the distribution range change unit 44 updates the distribution range information so that the distribution range is enlarged. However, in the case of a determination that the distribution range is not effective, the distribution range change unit 44 updates the distribution range information so that the distribution range is reduced. Accordingly, whether the distribution range is effective can be determined based on the visit status (visit distance) of users of the mobile terminals 2 who have visited the facility in the evaluation information. It is therefore possible to enlarge the distribution range if the distribution range is effective, and reduce the distribution range if the distribution range is not effective.

Embodiment 2

In Embodiment 1, the example was described in which if the current location of a mobile terminal is within the location range of a facility for at least a stay determination time, it is determined that the user of the mobile terminal has visited the facility. In contrast, in Embodiment 2, the example is described in which if the user of a mobile terminal has set a facility in evaluation information as a destination or a stopover, it is determined that the user of the mobile terminal has visited the facility.

Figure 15:
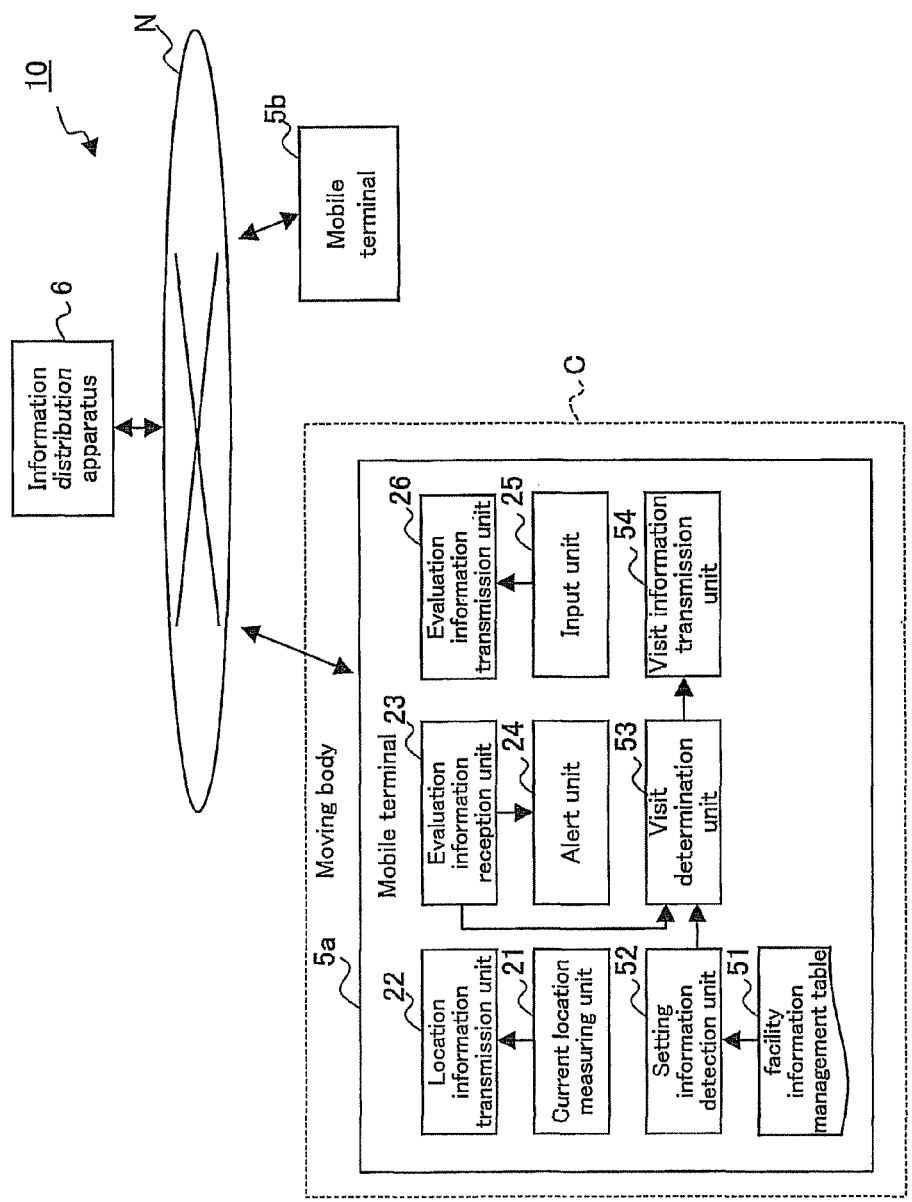
FIG. 15 is a block diagram showing a schematic configuration of a communication system according to Embodiment 2 of the present invention.

FIG. 15 is a block diagram showing a schematic configuration of a communication system 10 according to the present embodiment. Specifically, the communication system 10 according to the present embodiment includes mobile terminals 5a and 5b instead of the mobile terminals 2a and 2b shown in FIG. 1. Also, the communication system 10 according to the present embodiment includes an information distribution apparatus 6 instead of the information distribution apparatus 3 shown in FIG. 1. The mobile terminals 5a and 5b and the information distribution apparatus 6 are interconnected via the Internet N. The mobile terminals 5a and 5b are, for example, navigation apparatuses that can be mounted to a moving body C such as a vehicle. In other words, the mobile terminals 5a and 5b can provide navigation from the current location to a destination or a stopover. The information distribution apparatus 6 is an apparatus that distributes evaluation information indicating an evaluation of a facility to the mobile terminals 5a and 5b. Note that in FIG. 15, the same reference characters have been given to structures having the same functions as in FIG. 1, and detailed descriptions thereof have been omitted.

Although two mobile terminals 5a and 5b and one information distribution apparatus 6 are shown in FIG. 15 in order to simplify the description, the communication system 10 is constituted by an arbitrary number of mobile terminals 5a and 5b and information distribution apparatuses 6. Also, another terminal apparatus, a web server, a proxy server, a DNS server, a DHCP server, and the like may exist in the communication system 10.

Mobile Terminal Configuration

In addition to the members in the mobile terminal 2a shown in FIG. 1, the mobile terminal 5a includes a facility information management table 51, a setting information detection unit 52, a visit determination unit 53, and a visit information transmission unit 54. The configuration of the mobile terminal 5b is the same as the configuration of the mobile terminal 5a. Note that the visit determination unit 53 and the information distribution apparatus 6 are an embodiment of an information distribution system of the present invention.

The facility information management table 51 stores facility information for identifying facilities, and facility location information indicating a location range of such facilities. The data structure of the facility information management table 51 is the same as the data structure of the facility information management table 34 shown in FIG. 3.

If the user of the mobile terminal 5a has set a desired facility as a destination or stopover by, for example, operating the input unit 25 in order to realize navigation, the setting information detection unit 52 detects the set facility as setting information. The setting information detection unit 52 extracts facility information from the facility information management table 51 based on the detected setting information. The setting information detection unit 52 outputs the extracted facility information to the visit determination unit 53.

If the user of the mobile terminal 5a to which evaluation information has been distributed has set the facility in the evaluation information as a destination or stopover, the visit determination unit 53 determines that the user of the mobile terminal 5a has visited the facility.

Specifically, the visit determination unit 53 determines whether there is a match between facility information output from the evaluation information reception unit 23 and facility information output from the setting information detection unit 52. In other words, the evaluation information reception unit 23 outputs, to the visit determination unit 53, facility information corresponding to received evaluation information. Upon determining that there is a match between the facility information output from the evaluation information reception unit 23 and the facility information output from the setting information detection unit 52, the visit determination unit 53 determines that the user of the mobile terminal 5a has visited the facility indicated by the facility information output from the evaluation information reception unit 23. In this case, the visit determination unit 53 outputs, to the visit information transmission unit 54, visit information indicating that the user of the mobile terminal 5a has visited the facility in the evaluation information.

The visit information transmission unit 54 transmits the visit information output from the visit determination unit 53 to the information distribution apparatus 6. In the present embodiment, the visit information transmission unit 54 transmits the visit information to the information distribution apparatus 6 in real-time.

Meanwhile, the mobile terminal 5a is also realized by installing a program in an arbitrary computer such as a personal computer. Specifically, the setting information detection unit 52, the visit determination unit 53, and the visit information transmission unit 54 are realized by a CPU of the computer operating in accordance with the program that realizes the functions of these units. Accordingly, the program for realizing the functions of the setting information detection unit 52, the visit determination unit 53, and the visit information transmission unit 54, as well as a recording medium having the program recorded thereon are also embodiments of the present invention. Also, the facility information management table 51 is embodied by an internal storage apparatus of the computer or a storage apparatus that can be accessed from the computer.

Information Distribution Apparatus Configuration

Figure 16:
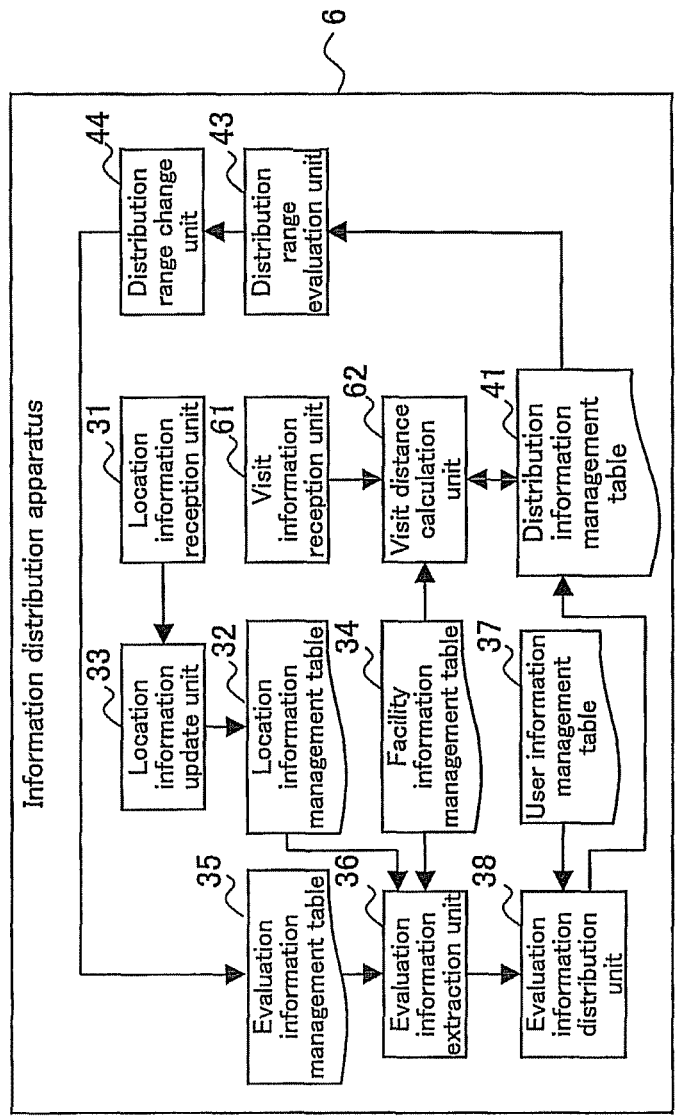
FIG. 16 is a block diagram showing a schematic configuration of an information distribution apparatus in the communication system.

FIG. 16 is a block diagram showing a schematic configuration of the information distribution apparatus 6. The information distribution apparatus 6 includes a visit information reception unit 61, and a visit distance calculation unit 62 instead of the facility information extraction unit 39, the stay determination time management table 40, and the visit determination unit 42 shown in FIG. 1. Note that the visit information reception unit 61 and the visit distance calculation unit 62 are realized also by a CPU of the computer operating in accordance with the program that realizes the functions of these units.

The visit information reception unit 61 receives visit information that has been transmitted from the mobile terminal 5. The visit information reception unit 61 outputs the received visit information to the visit distance calculation unit 62.

If the visit information output from the visit information reception unit 61 indicates that the user of the mobile terminal 5 has visited the facility in the evaluation information, the visit distance calculation unit 62 writes "true" as the visit state in the distribution information management table 41. In this case, the visit distance calculation unit 62 extracts distribution time terminal location information stored in the distribution information management table 41 based on the mobile terminal ID. The visit distance calculation unit 62 also extracts facility location information stored in the facility information management table 34 based on the facility ID of the facility indicated by the visit information. The visit distance calculation unit 62 calculates a visit distance indicating the distance between the location of the mobile terminal 5 indicated by the distribution time terminal location information and the location of the facility indicated by the facility location information. The visit distance calculation unit 62 writes the calculated visit distance in the distribution information management table 41.

Also, the visit distance calculation unit 62 extracts a record from the distribution information management table 41 each time a predetermined time has elapsed; if the visit state in the extracted record is not "true", the visit distance calculation unit 62 compares the distribution time in the extracted record and the current time, and if the difference between these times is greater than or equal to a threshold value, the visit distance calculation unit 62 determines that the user of the mobile terminal 5 has not visited the facility in the evaluation information. In other words, if a time period that is at least the threshold value has elapsed since the evaluation information was distributed to the mobile terminal 5, and furthermore the visit state in the extracted record is not "true", the visit distance calculation unit 62 determines the user of the mobile terminal 5 has not visited the facility in the evaluation information. In this case, the visit distance calculation unit 62 writes "false", which indicates that the user of the mobile terminal 5 has not visited the facility, in the distribution information management table 41.

Example of Operations in the Communication System

The following describes operations performed in the communication system 10 having the configuration described above, with reference to FIG. 17.

Figure 17:
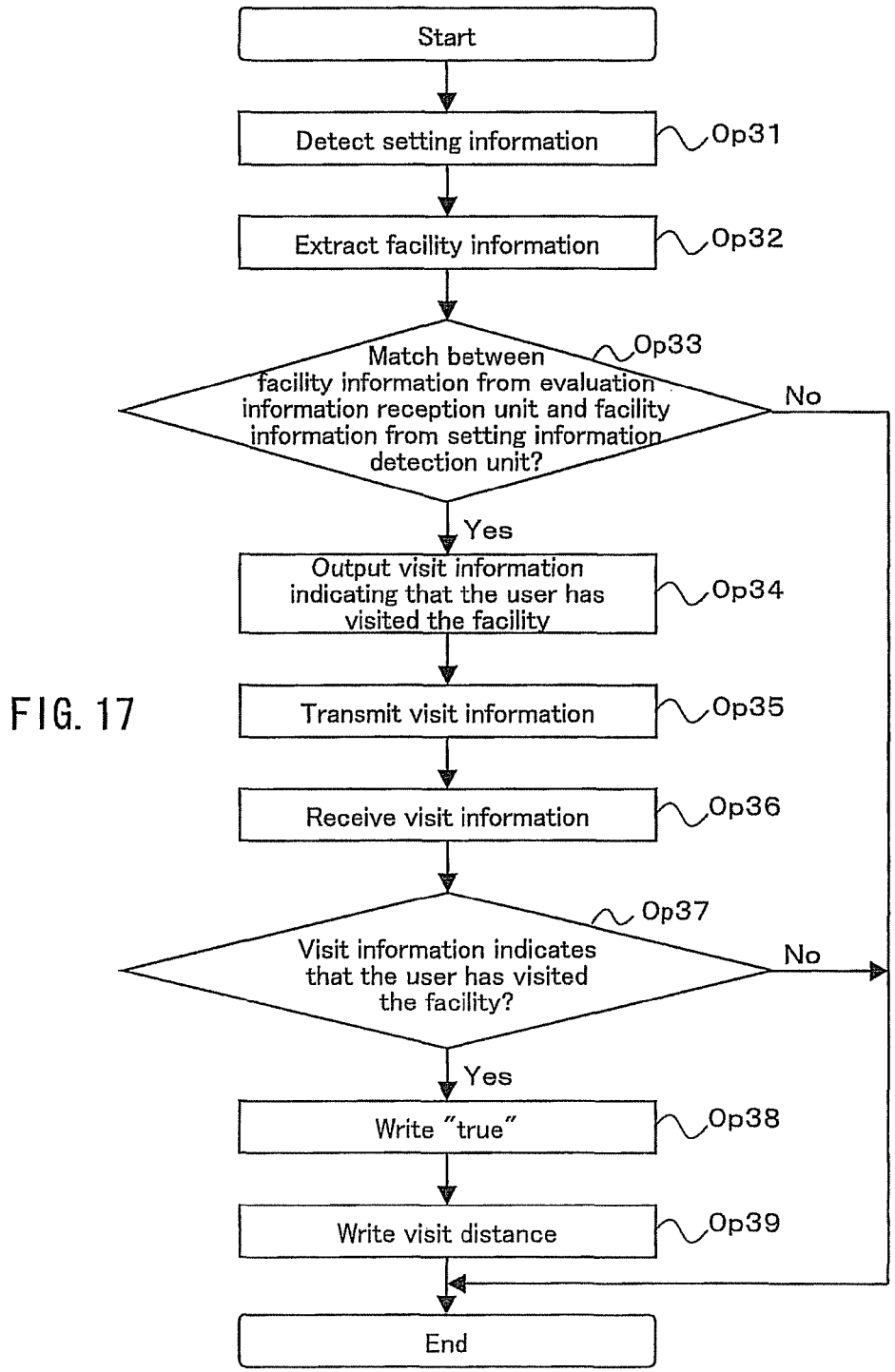
FIG. 17 is a flowchart showing an example of operations performed in the communication system in which a mobile terminal in the communication system transmits visit information to the information distribution apparatus, and the information distribution apparatus calculates a visit distance.

FIG. 17 is a flowchart showing an example of operations performed in the communication system 10 in which the mobile terminal 5 transmits visit information to the information distribution apparatus 6, and the information distribution apparatus 6 calculates a visit distance. As shown in FIG. 17, if the user of the mobile terminal 5 has set a desired facility as the destination or stopover, the setting information detection unit 52 detects the set facility as setting information (step Op31). The setting information detection unit 52 extracts facility information from the facility information management table 51 based on the setting information detected in step Op31 (step Op32).

The visit determination unit 53 then determines whether there is a match between facility information output from the evaluation information reception unit 23 and the facility information extracted in step Op32 (step Op33). Upon determining that there is a match between the facility information output from the evaluation information reception unit 23 and the facility information extracted in step Op32 (YES in step Op33), the visit determination unit 53 determines that the user of the mobile terminal 5 has visited the facility indicated by the facility information output from the evaluation information reception unit 23. In this case, the visit determination unit 53 outputs, to the visit information transmission unit 54, visit information indicating that the user of the mobile terminal 5 has visited the facility in the evaluation information (step Op34).

However, if the visit determination unit 53 determines that there is not a match between the facility information output from the evaluation information reception unit 23 and the facility information extracted in step Op32 (NO in step Op33), the processing of FIG. 17 ends.

The visit information transmission unit 54 then transmits the visit information that was output in step Op34 to the information distribution apparatus 6 (step Op35).

Next, the visit information reception unit 61 of the information distribution apparatus 6 receives the visit information transmitted in step Op35 (step Op36).

The visit distance calculation unit 62 then determines whether the visit information received in step Op36 indicates that the user of the mobile terminal 5 has visited the facility in the evaluation information (step Op37). Upon determining that the visit information received in step Op36 indicates that the user of the mobile terminal 5 has visited the facility in the evaluation information (YES in step Op37), the visit distance calculation unit 62 writes "true" as the visit state in the distribution information management table 41 (step Op38). At this time, the visit distance calculation unit 62 calculates a visit distance indicating a distance between the location of the mobile terminal 5 indicated by the distribution time terminal location information and the location of the facility indicated by the facility location information, and writes the calculated visit distance in the distribution information management table 41 (step Op39).

However, if the visit distance calculation unit 62 has determined that the visit information received in step Op36 does not indicate that the user of the mobile terminal 5 has visited the facility in the evaluation information (NO in step Op37), the processing of FIG. 17 ends.

Note that the processing in which the visit distance calculation unit 62 writes "false" as the visit state in the distribution information management table 41 is the same as the processing in FIG. 13. A description of this processing has therefore been omitted.

As described above, according to the communication system 10 of the present embodiment, the visit determination unit 53 can determine whether the user of the mobile terminal 5 has visited a facility in evaluation information by merely according to whether the facility has been set as a destination or stopover.

Embodiment 3

In Embodiments 1 and 2, the example is described in which whether the user of a mobile terminal has visited a facility in evaluation information is determined based on the current location of the mobile terminal or setting information of the mobile terminal. In contrast, in Embodiment 3, the example is described in which if the display range displayed on the display unit has been reduced, whether to display a facility in evaluation information on a map is controlled according to whether the distribution range of the facility in the evaluation information being displayed in the display range is greater than or equal to a threshold value.

Note that as one example in the present embodiment, it is assumed that the distribution range of a parking lot having the facility name "EEE" is "3" km, the distribution range of a convenience store having the facility name "GGG" is "8" km, the distribution range of a gas station having the facility name "CCC" is "10" km, and the distribution range of a convenience store having the facility name "AAA" is "5" km.

Figure 18:
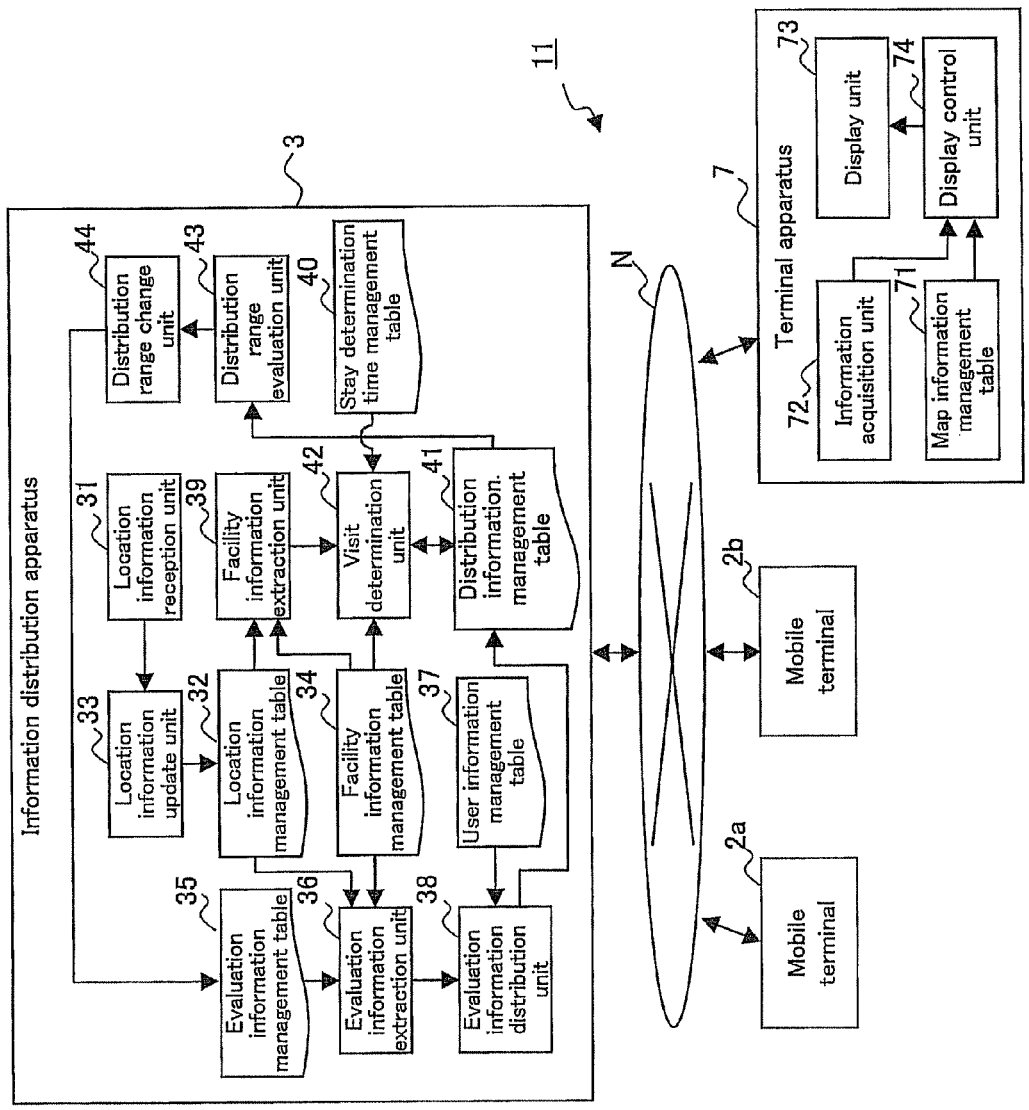
FIG. 18 is a block diagram showing a schematic configuration of a communication system according to Embodiment 3 of the present invention.

FIG. 18 is a block diagram showing a schematic configuration of a communication system 11 according to the present embodiment. Specifically, the communication system 11 according to the present embodiment includes a terminal apparatus 7 in addition to the elements of the communication system 1 shown in FIG. 1. Note that in FIG. 18, the same reference characters have been given to structures having the same functions as in FIG. 1, and detailed descriptions thereof have been omitted. It should also be noted that the terminal apparatus 7 may be included in the communication system 10 shown in FIG. 15.

The terminal apparatus 7 includes a map information management table 71, an information acquisition unit 72, a display unit 73, and a display control unit 74. The terminal apparatus 7 is, for example, a personal computer that can access the Internet N.

The map information management table 71 stores map information indicating maps. A map is a figure indicating surface-based objects and phenomena on a plane at a reduced size according to a certain scale, with use of symbols and characters. The map information is stored in the map information management table 71 by, for example, installing a CD (Compact Disc) or a MD (Mini Disc) on which map data is recorded.

The information acquisition unit 72 acquires evaluation information and distribution range information that are stored in the evaluation information management table 35. The information acquisition unit 72 also acquires facility information and facility location information that are stored in the facility information management table 34, based on the acquired evaluation information. Specifically, as a result of, for example, a user of the terminal apparatus 7 operating an input means that is not shown in the figures, the information acquisition unit 72 accesses the information distribution apparatus 3 via the Internet N, and acquires evaluation information and distribution range information that are stored in the evaluation information management table 35. Note that the information acquisition unit 72 may acquire all evaluation information and distribution range information that is stored in the evaluation information management table 35, or may acquire part of the evaluation information and distribution range information. The information acquisition unit 72 acquires facility information and facility location information that are stored in the facility information management table 34, based on the acquired evaluation information. The information acquisition unit 72 outputs the acquired evaluation information, distribution range information, facility information, and facility location information to the display control unit 74.

The display unit 73 is constituted from a liquid crystal display, an organic EL display, a plasma display, a CRT display, or the like. Note that in order for the terminal apparatus 7 to have a thin configuration, a flat plate type display element such as a liquid crystal display or an organic EL display is preferably used as the display unit 73.

Figure 19:
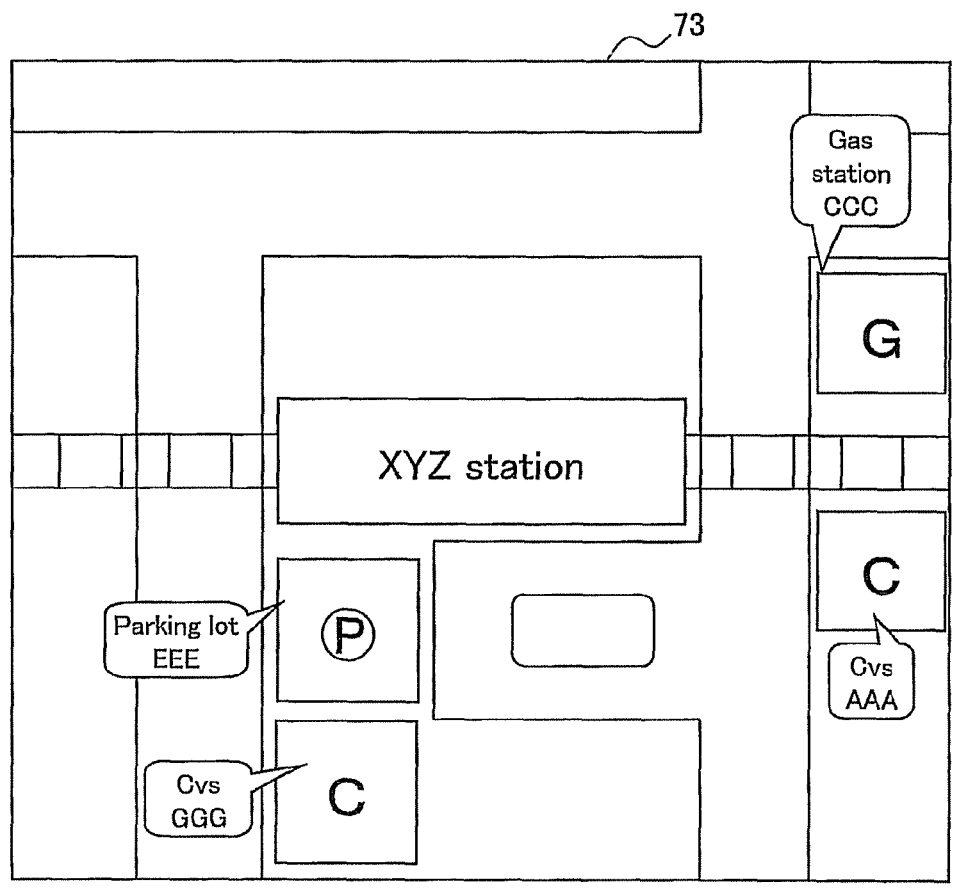
FIG. 19 is a conceptual diagram showing an exemplary display screen displayed by a display unit in a terminal apparatus of the communication system.

The display control unit 74 controls the display unit 73 so that a facility indicated by facility information output from the information acquisition unit 72 is displayed on a map in the map information. Specifically, the display control unit 74 first extracts map information stored in the map information management table 71. The display control unit 74 controls the display unit 73 so that a facility type and a facility name indicated by the facility information output from the information acquisition unit 72 are displayed on a map in the extracted map information. FIG. 19 is a conceptual diagram showing an exemplary display screen displayed by the display unit 73. As shown in FIG. 19, the display unit 73 displays the facility name "EEE" of the facility type "parking lot", the facility name "GGG" of the facility type "CVS", the facility name "CCC" of the facility type "gas station", and the facility name "AAA" of the facility type "CVS" in the vicinity of the corresponding facilities on the map in the map information. Note that in FIG. 19, the display unit 73 displays convenience stores as "CVS".

Here, when for example the user of the terminal apparatus 7 operates, with use of the input means, a facility name displayed on the map, the display control unit 74 controls the display unit 73 so that an evaluation comment indicated by evaluation information corresponding to the facility name is displayed. The user of the terminal apparatus 7 therefore can check evaluation comments regarding the facility. Note that the display control unit 74 may control the display unit 73 so that an evaluation comment indicated by the evaluation information is displayed if for example, the display range of the map displayed by the display unit 73 is enlarged to a certain range as a result of the user of the terminal apparatus 7 operating the input means. Also, the display control unit 74 may control the display unit 73 so that a facility name indicated by the facility information and an evaluation comment indicated by the evaluation information are displayed at the same time. In other words, the mode and timing according to which facility names and evaluation comments are displayed are arbitrary.

Also, if the user of the terminal apparatus 7 has reduced the display range of the map displayed by the display unit 73 by, for example, operating the input means, the display control unit 74 controls whether to display the facility in the evaluation information on the map in accordance with whether the distribution range of the facility in the evaluation information being displayed in the display range is greater than or equal to a threshold value.

Specifically, if the display range of the map displayed by the display unit 73 has been reduced to a certain range, the display control unit 74 determines whether the distribution range of the facility in the evaluation information being displayed in the display range is greater than or equal to the threshold value. Note that in the present embodiment, the threshold have is considered to be "6" km. The threshold value is preset by the user of the terminal apparatus 7. In the present embodiment, the distribution range of the facility name "EEE" is "3" km, and therefore the display control unit 74 determines that the distribution range of the facility name "EEE" is less than the threshold value. Also, the distribution range of the facility name "GGG" is "8" km, and therefore the display control unit 74 determines that the distribution range of the facility name "GGG" is greater than or equal to the threshold value. Also, the distribution range of the facility name "CCC" is "10" km, and therefore the display control unit 74 determines that the distribution range of the facility name "CCC" is greater than or equal to the threshold value. Furthermore, the distribution range of the facility name "AAA" is "5" km, and therefore the display control unit 74 determines that the distribution range of the facility name "AAA" is less than the threshold value.

Figure 20:
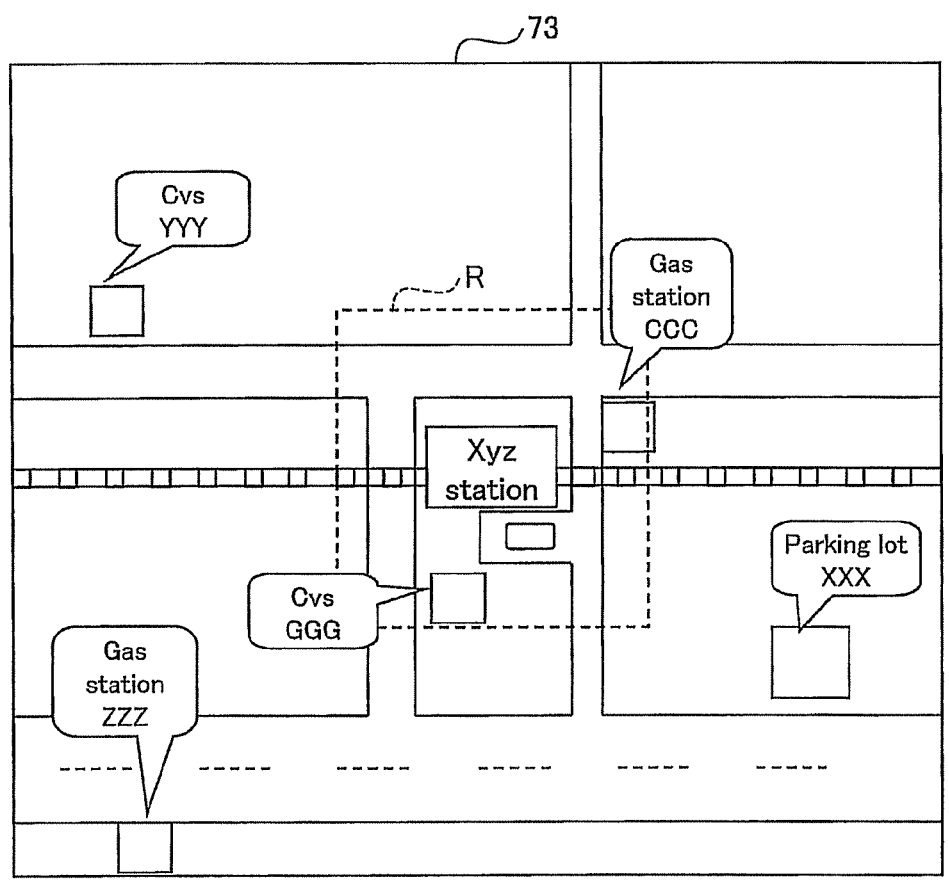
FIG. 20 is a conceptual diagram showing an exemplary display screen displayed by the display unit in the case in which the display range of the display unit shown in FIG. 19 has been reduced to a certain range.

FIG. 20 is a conceptual diagram showing an exemplary display screen displayed by the display unit 73 in the case in which the display range of the display unit 73 shown in FIG. 19 has been reduced to a certain range (display range) R. As shown in FIG. 20, the facility name "GGG" of the facility type "CVS" and the facility name "CCC" of the facility type "gas station", whose distribution ranges are greater than or equal to the threshold value, are displayed in the display range R in the vicinity of the respective facilities in the map of the map information. However, the facility name "EEE" of the facility type "parking lot" and the facility name "AAA" of the facility type "CVS", whose distribution ranges are less than the threshold value, are not displayed in the display range R.

Note that the terminal apparatus 7 is also realized by installing a program in an arbitrary computer such as a personal computer. Specifically, the information acquisition unit 72, the display unit 73, and the display control unit 74 are realized by a CPU of the computer operating in accordance with the program that realizes the functions of these units. Accordingly, the program for realizing the functions of the information acquisition unit 72, the display unit 73, and the display control unit 74, as well as a recording medium having the program recorded thereon are also embodiments of the present invention. Also, the map information management table 71 is embodied by an internal storage apparatus of the computer or a storage apparatus that can be accessed from the computer.

Also, although the example in which the map information management table 71, the information acquisition unit 72, the display unit 73, and the display control unit 74 are included in the terminal apparatus 7 is described above, the present invention is not limited to this. For example, the map information management table 71, the information acquisition unit 72, the display unit 73, and the display control unit 74 may be included in the mobile terminal 2 or the information distribution apparatus 3. Accordingly, if the display range being displayed by the display unit has been reduced in the mobile terminal 2 or the information distribution apparatus 3, it is possible to control whether a facility in evaluation information is displayed on a map in accordance with whether the distribution range of the facility in the evaluation information displayed in the display range is greater than or equal to threshold value.

As described above, according to the communication system 11 of the present embodiment, if the display range of the map displayed by the display unit 73 has been reduced, the display control unit 74 controls whether to display a facility in evaluation information on a map in accordance with whether the distribution range of the facility in the evaluation information being displayed in the display range is greater than or equal to a threshold value. Accordingly, for example, the display control unit 74 can perform control so that, when the display range of the map has been reduced, the facility in the evaluation information is displayed on the map if the distribution range of the facility in the evaluation information is greater than or equal to the threshold value, and the facility in the evaluation information is not displayed on the map if the distribution range of the facility in the evaluation information is less than the threshold value. Therefore, even if the display range of the map has been reduced, facilities having beneficial evaluation information can continue to be displayed on the map.

Note that in Embodiment 1, the example is described in which the visit determination unit determines that the user of a mobile terminal has visited a facility if the current location of the mobile terminal is within the location range of the facility for at least a stay determination time. In Embodiment 2, the example is described in which the visit determination unit determines that the user of a mobile terminal has visited a facility in evaluation information if the user of the mobile terminal has set the facility as a destination or stopover. However, the present invention is not limited to only these implementations. For example, a configuration is possible in which the visit determination unit determines that the user of a mobile terminal has visited a facility if the user of the mobile terminal has purchased a product or the like on display at the facility with use of the mobile terminal.

Also, although the example in which the tables store information in a table format is described in Embodiments 1 to 3, the present invention is not limited to this. In other words, an arbitrary storage format may be used.

Furthermore, although the example in which the mobile terminals and the information distribution apparatus are interconnected via the Internet is described in Embodiments 1 to 3, the present invention is not limited to this. For example, the mobile terminals and the information distribution apparatus may be interconnected via Ethernet (registered trademark), or may be accessible to each other wirelessly.

The present invention is not limited to Embodiments 1 to 3, and various modifications that fall within the scope of the claims are possible. In other words, embodiments obtained by combining technical means that have been appropriately modified within the scope of the claims are also included in the technical scope of the present invention.

INDUSTRIAL APPLICABILITY

As described above, the present invention is useful as an information distribution system, an information distribution method, or an information distribution program that distributes evaluation information indicating an evaluation of a facility to a mobile terminal if the current location of the mobile terminal is within a distribution range from the facility.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information distribution method comprising:
   acquiring, by a computer, terminal location information of a plurality of mobile terminals, the terminal location information representing each location at which each of the plurality of mobile terminals receives distributed evaluation information of a facility;
   determining whether a user of one of the plurality of mobile terminals which have received the evaluation information has visited the facility in the evaluation information and calculating a visit distance between the facility which the user has visited and a location at which a mobile terminal of the user receives the evaluation information of the facility which the user has visited, using the terminal location information; and
   defining a distribution range of the evaluation information using a relationship between the visit distance calculated and a threshold number of visits to the facility by recipients of the distributed evaluation information.

2. The information distribution method according to claim 1, wherein the threshold number of visits is obtained by multiplying a number of the mobile terminals that received the evaluation information and an expectation value.

3. A non-transitory computer readable medium having stored therein a program to cause a computer to execute an operation, comprising:
   acquiring terminal location information of a plurality of terminals, the terminal location information representing each location at which each of the plurality of mobile terminals receives distributed evaluation information of a facility;
   determining whether a user of one of the plurality of mobile terminals which have received the evaluation information has visited the facility in the evaluation information and calculating a visit distance between the facility which the user has visited and a location at which a mobile terminal of the user receives the evaluation information of the facility which the user has visited, using the terminal location information;
   defining a distribution range of the evaluation information using a relationship between the visit distance calculated and a threshold number of visits to the facility by recipients of the distributed evaluation information.

4. The non-transitory computer readable medium according to claim 3, wherein the defining indicates whether the distribution range is effective based on a sum of users of the plurality of terminals within the visit distance who have visited the facility.

5. The non-transitory computer readable medium according to claim 4, wherein the distribution range is reduced when the distribution range is determined to be not effective.

6. The non-transitory computer readable medium according to claim 3, wherein the threshold number of visits is obtained by multiplying a number of the mobile terminals that received the evaluation information and an expectation value.

* * * * *